United States Patent [19]
Koyama

[11] Patent Number: 5,745,449
[45] Date of Patent: Apr. 28, 1998

[54] OPTICAL INFORMATION RECORDING/ REPRODUCING METHOD AND APPARATUS FOR DETERMINING A RELATIVE TRACKING OFFSET AMOUNT OF LIGHT SPOTS ON A RECORDING MEDIUM TO PERFORM TRACKING CONTROL

[75] Inventor: Osamu Koyama, Yokohama, Japan

[73] Assignee: Canon Kabushiki Kaisha, Tokyo, Japan

[21] Appl. No.: 973,975

[22] Filed: Nov. 9, 1992

[30] Foreign Application Priority Data

Nov. 14, 1991 [JP] Japan ................... 3-325106

[51] Int. Cl.$^6$ .................................................. G11B 7/09
[52] U.S. Cl. ........................ 369/44.32; 369/44.28; 369/44.38; 369/44.29
[58] Field of Search ...................... 369/44.32, 44.26, 369/44.37, 44.36, 54, 44.11, 44.29, 44.35, 44.27, 44.28; 250/201.5

[56] References Cited

U.S. PATENT DOCUMENTS

| | | | |
|---|---|---|---|
| 4,764,914 | 8/1988 | Estes et al. | 369/58 |
| 4,982,394 | 1/1991 | Kanda et al. | 369/44.32 |
| 5,018,124 | 5/1991 | Ogasawara et al. | 369/44.32 |
| 5,105,407 | 4/1992 | Ishika | 369/44.37 |
| 5,105,410 | 4/1992 | Maeda et al. | 369/44.37 |
| 5,138,592 | 8/1992 | Fujita | 369/44.37 |
| 5,199,016 | 3/1993 | Shikichi | 369/54 |
| 5,202,865 | 4/1993 | Yanagi | 369/44.37 |
| 5,293,366 | 3/1994 | Ohta | 369/44.38 X |

FOREIGN PATENT DOCUMENTS

| | | |
|---|---|---|
| 0210623 | 2/1987 | European Pat. Off. . |
| 0310162 | 4/1989 | European Pat. Off. . |
| 51-107121 | 9/1976 | Japan . |
| 64-82348 | 3/1989 | Japan . |
| 1-177510 | 7/1989 | Japan . |

OTHER PUBLICATIONS

Patent Abstracts of Japan, vol. 8, No. 121, Kokai No. 59-028249, Jun. 1984.
Patent Abstracts of Japan, vol. 8, No. 257, Kokai No. 59-127239, Nov. 1984.

*Primary Examiner*—Thang V. Tran
*Attorney, Agent, or Firm*—Fitzpatrick, Cella, Harper & Scinto

[57] ABSTRACT

An optical information recording and/or reproducing apparatus includes a device for forming first and second light spots on an optical information recording medium to perform recording and/or reproducing of information on the recording medium and a tracking control device for conducting tracking control for at least one of the first and the second light spots. The optical information recording apparatus may further includes a detecting device for detecting an eccentricity amount of the recording medium, a calculating device for calculating a tracking offset amount to be assigned at a predetermined ratio to the first and second light spots based on the eccentricity amount detected, position information of the first light spot on the recording medium, and distance information between the first and the second light spots, and an applying device for applying the offset amount calculated to the tracking control device. The recording apparatus may have a detecting device for detecting a relative track deviation amount of the first and second light spots, and a calculating device for calculating a tracking offset amount to assign the track deviation amount detected at a predetermined ratio to the first and second light spots.

7 Claims, 18 Drawing Sheets

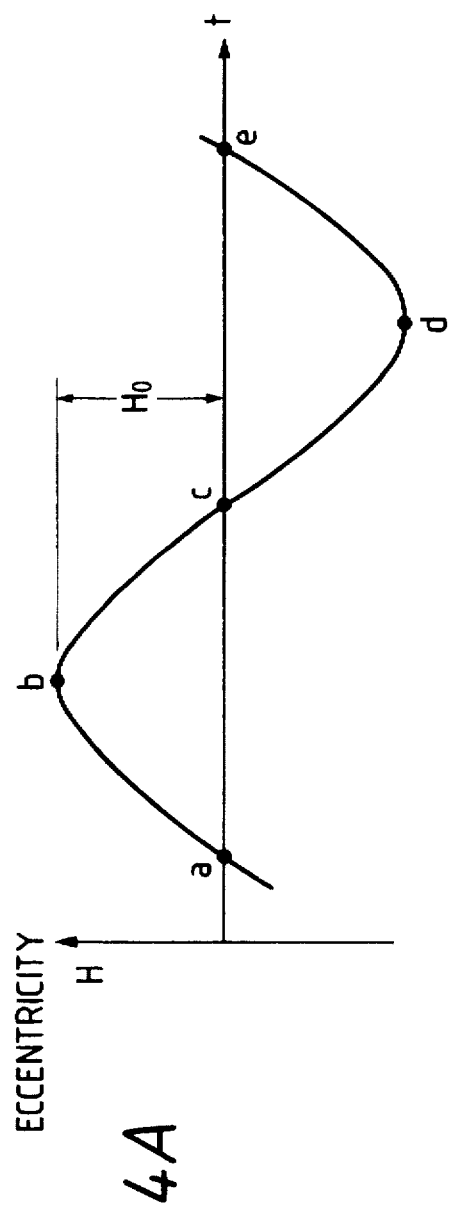
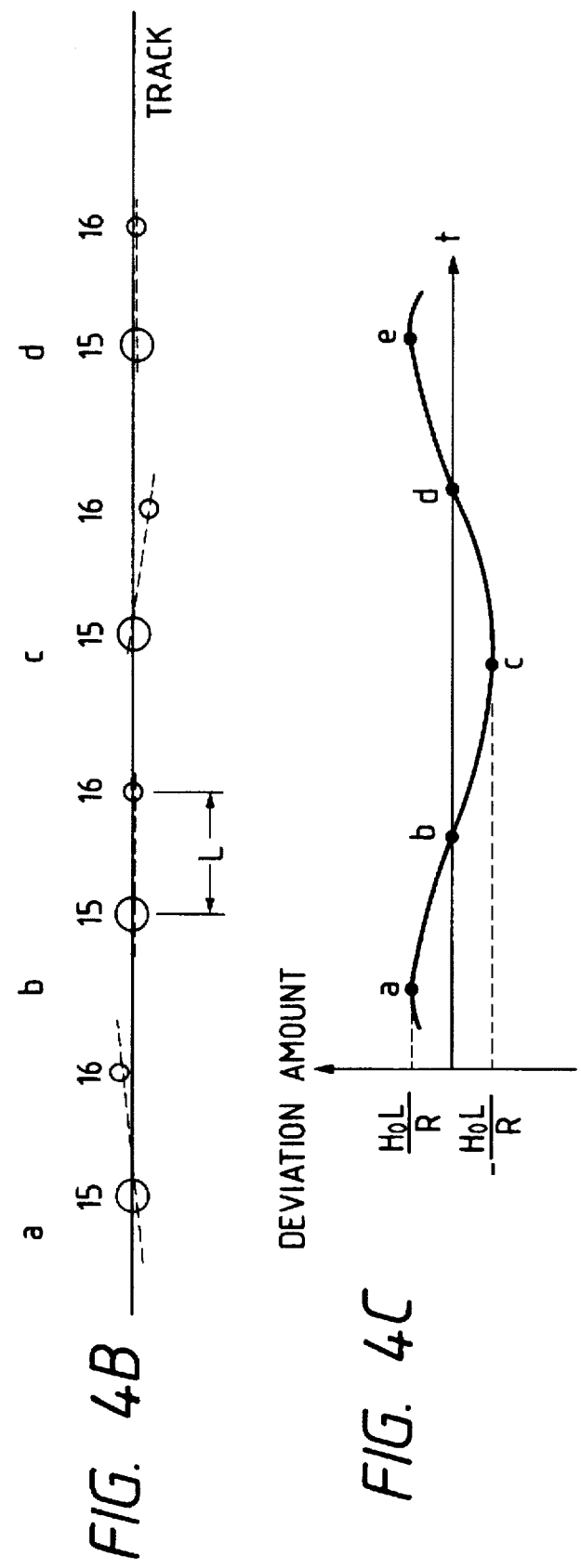
FIG. 4A
FIG. 4B
FIG. 4C

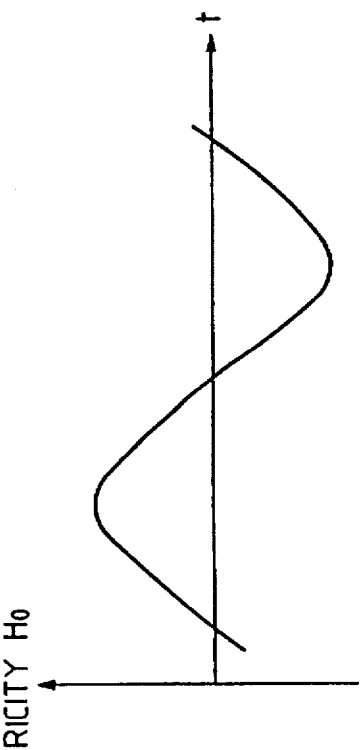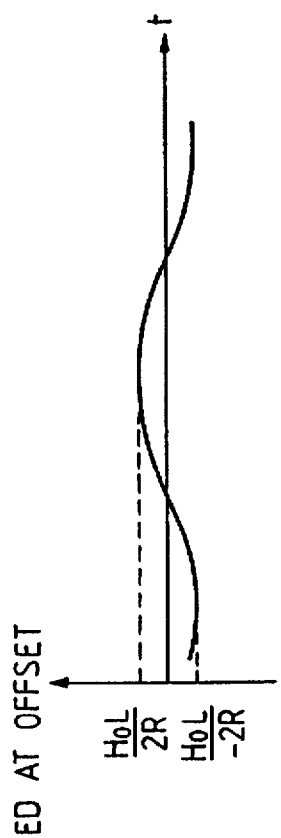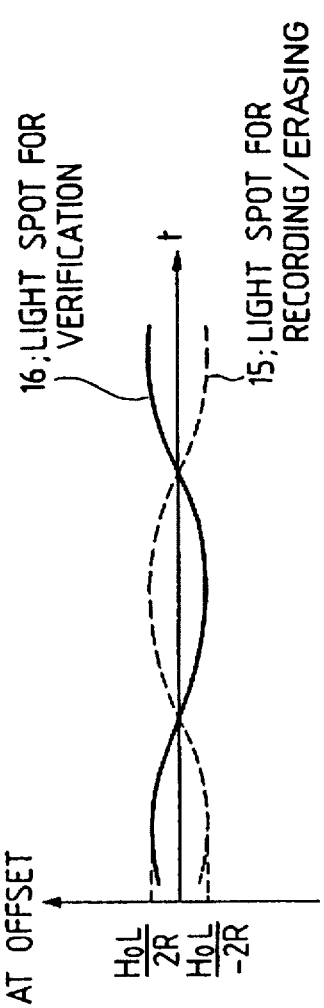
FIG. 10A
FIG. 10B
FIG. 10C

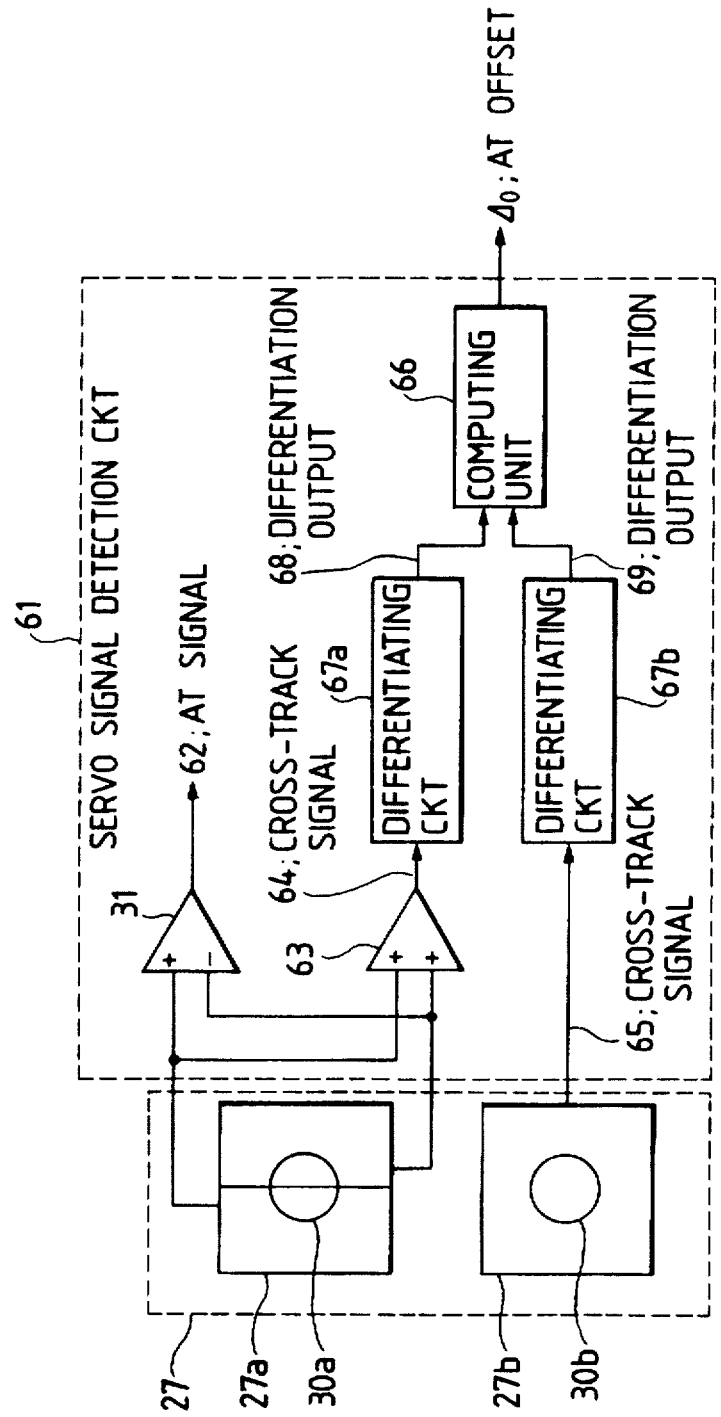

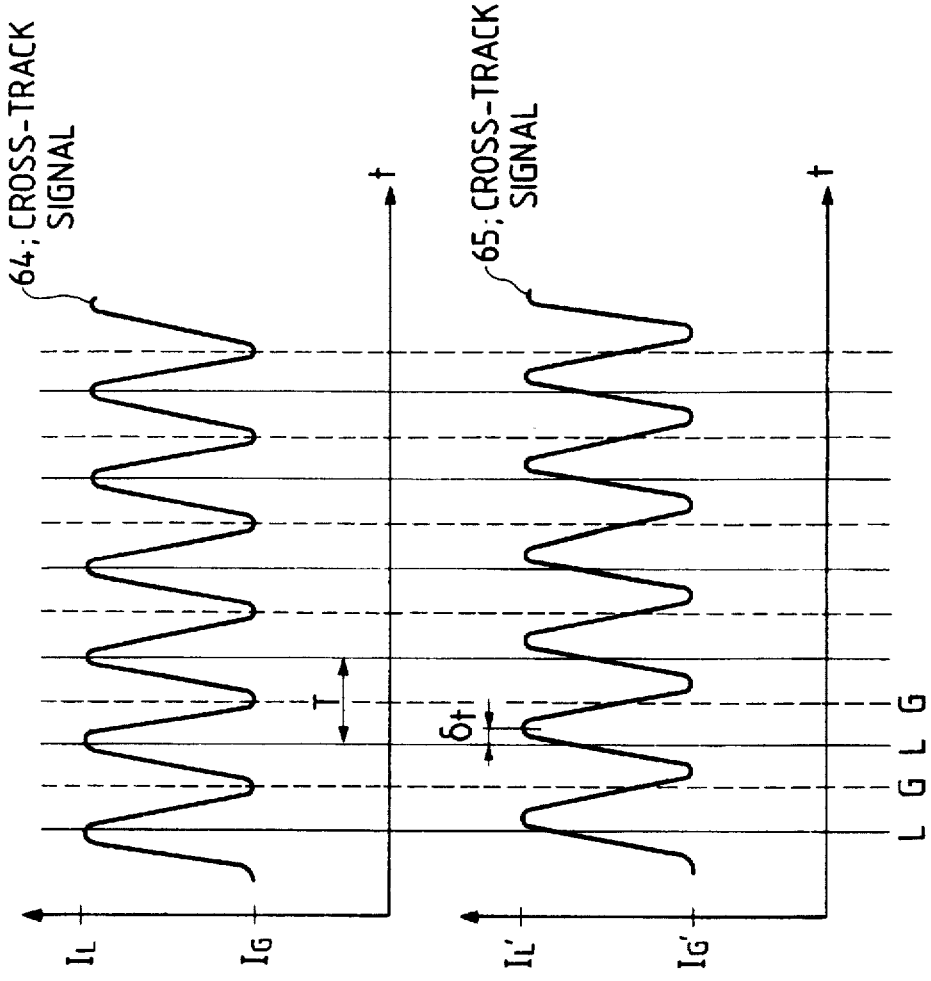

OPTICAL INFORMATION RECORDING/ REPRODUCING METHOD AND APPARATUS FOR DETERMINING A RELATIVE TRACKING OFFSET AMOUNT OF LIGHT SPOTS ON A RECORDING MEDIUM TO PERFORM TRACKING CONTROL

BACKGROUND OF THE INVENTION

1. Field of the Invention

The present invention relates to an optical information recording/reproducing apparatus for recording information and/or reproducing information from an information recording medium using a plurality of optical beams.

2. Related Background Art

There is known as a magneto-optical disk apparatus permitting overwriting of information, an apparatus employing a method in which a magnetic field applied to a magneto-optical recording medium is modulated depending upon information to be recorded, for example, as described in Japanese Laid-open Patent Application No. 51-107121. Also, there is proposed, to increase the data processing speed of a magneto-optical disk, an optical disk apparatus capable of erasing, recording, and reproducing information with a rotation of the disk by providing a plurality of beams for recording and for verification on a track of a recording medium in addition to the above arrangement, for example, as described in Japanese Laid-open Patent Application No. 64-82348. Further, there is proposed an optical disk apparatus using a rotation of a trapezoidal shaped prism to accurately locate a plurality of beams on a track, for example, as described in Japanese Laid-open Patent Application No. 1-177510. FIG. 1 is a constitutional drawing to show an example of such conventional optical disk apparatuses, in which reference numeral 1 designates a magneto-optical recording medium having a magneto-optical effect and disposed on a transparent substrate 3 a disk, and numeral 2 a protection film. Optical fluxes emitted from a semiconductor laser 4 are collimated by a collimator lens 5 to become parallel optical fluxes, and the parallel fluxes are separated by a diffraction grating 6 into a plurality of optical fluxes (three optical fluxes of zero-order and ±first-order). The optical fluxes incident into the trapezoidal shaped prism 7 are reflected at an internal surface thereof, and then enter a polarized light beam splitter 9. Numeral 8 is an actuator to rotate the trapezoidal shaped prism 7 about the optical axis. The optical fluxes are reflected by a mirror 10, and then form images of three light spots 14, 15, and 16 through an objective lens 11 on a certain track on the recording medium 1. Numeral 12 denotes an actuator for focusing and tracking.

FIG. 2 shows the light spots on the magneto-optical recording medium 1 and an intensity of each light spot in recording while reproducing. The central light spot 15 is the zero-order light, and the light spots 14 and 16 ±first-order diffracted lights, as aligned on the track as shown. Defining a disk rotation direction as shown by the arrow, the light spot 15 may be used as a light spot for recording and erasing, and the light spot 16 as a light spot for verification reproduction immediately after recording. An intensity ratio of the light spots may be changed by the diffraction grating 6. For example, the light spot for recording and erasing is set at 7 mW, and the light spot for verification reproduction is at 1 mW. FIG. 2 also shows emission powers of the laser source in reproduction and in recording. A laser is emitted with a low power $P_R$ in reproduction, whereby the light spot 15 has a power of about 1 mW to conduct reproduction of a magneto-optical signal or servo signal detection. The light spot 16 is not used because of a low power thereof. In contrast, a laser is emitted with a high power $P_W$ in recording. In this case, the light spot 15 serves as a light spot for recording and erasing. Irradiated with a laser beam with a high power, the magneto-optical recording medium 1 increases a temperature thereof to decrease its magnetization and coercive force. Thus, applying a magnetic field polarity-inverted depending upon recording information through a magnetic head 10, magneto-optical pits may be recorded on the recording medium. Further, the light spot 16 has a power for reproduction in this state, so that the magneto-optical signal may be reproduced to perform an error check immediately after recording.

Now returning to FIG. 1, the optical fluxes reflected at a surface of the recording medium and then entering the objective lens 11 are reflected via the mirror 10 by the polarized light beam splitter 9 to be guided to a signal detection optical system. In FIG. 1, there is shown a difference detection system using a half-wave ($\lambda/2$) plate 21 and a polarized light beam splitter 22. The optical fluxes transmitted through the polarized light beam splitter 22 are guided through a condenser lens 23 and a cylindrical lens 24 onto a photo detector 25. The other optical fluxes reflected by the beam splitter 22 are guided through a condenser lens 26 onto a photo detector 27. Then, respective output signals of the photo detectors 25, 27 are transferred to a magneto-optical signal and servo detection circuit 28, in which a difference detection is carried out between the two photo detectors to reproduce the magneto-optical signal. In FIG. 1, reference numeral 17 designates a drive circuit of the semiconductor laser 4, 18 a drive circuit of the actuator 8, 19 a drive circuit of the actuator 12, 20 a drive circuit of the magnetic head 10, 28 the magneto-optical signal and servo signal detection circuit, and 29 a controller.

Next explained with reference to FIG. 3 is a detection system of a servo signal, specifically, of a tracking signal. FIG. 3 shows a state in which the optical fluxes reflected by the polarized light beam splitter 22 are converged by the condenser lens 26 on photo detectors 27-1, 27-2, and 27-3 as light spots 30-1, 30-2, and 30-3. The light spot 30-2 corresponds to the light spot 15 for recording and erasing on the recording medium, and the light spot 30-3 to the light spot 16 for verification reproduction. In overwriting, the two light spots must be correctly located on a track, and, therefore, tracking is carried out in the ordinary push-pull method with the light spot 15 for recording and erasing. An output of the light spot 30-2 on the two-divided photo detector 27-2 is input through a differential amplifier 31 to the actuator drive circuit 19 to conduct tracking by the objective lens actuator 12. Then, a rotation of the light spot 15 for recording and erasing and the light spot 16 for verification reproduction on the plane of the recording medium is corrected using a difference output between push-pull outputs of the light spot 30-1 and the light spot 30-3. Specifically, the difference output is an output of low frequency representing a rotation amount of the light spots 15 and 16 with respect to the track. Thus, inputting the difference output to the actuator drive circuit 18, a light spot rotation servo may be made effective through the rotation actuator 8 of the trapezoidal shaped prism 7. Numerals 32-1 and 32-2 denote amplifiers for obtaining a difference output of outputs of the two-divided photo detector 27-1 and of the detector 27-3, respectively, and numeral 33 a differential amplifier. These operations make the light spot 15 for recording and erasing and the light spot 16 for verification reproduction correctly located on an identical track within a predetermined accuracy in overwriting. In contrast, a tracking control is carried out in the ordinary push-pull method using only the light spot 15 in reproduction.

The above conventional example needs, however, the trapezoidal shaped prism 7 and the rotation actuator 8 in order to keep the predetermined tracking accuracy for the two spots, and needs a precise position alignment of the three light spots on the photo detectors in the tracking direction, which results in an increase of production cost. Also, the construction of the light head is complex, making it difficult to make the apparatus compact. Then, a tracking servo of the ordinary push/pull method was tested only with the light spot 15 for recording and erasing in overwriting without use of the trapezoidal shaped prism and the rotation actuator to inspect causes of track deviation of the light spot 16 for verification reproduction. It was found by this test that a most dominant factor is an eccentricity of the disk. This will be explained with reference to FIGS. 4A–4C. In FIG. 4A, an eccentricity of the recording medium 1 is taken on the vertical axis, a time on the horizontal axis, and H denotes an eccentricity amount. FIG. 4B shows a positional relation between the light spot 15 for recording and erasing and the light spot 16 for verification reproduction with respect to a track for each occurrence of an eccentricity amount. The eccentricity of the disk may be represented by the following equation.

$$H = H_0 \sin \omega t \qquad (1);$$

$$\omega = 2\pi f \qquad (2).$$

In the above equations, $H_0$ is a maximum eccentricity, and f is a rotation frequency of the recording medium. If the light spot 15 is on the track, a track deviation amount $\delta$ of the light spot 16 may be represented by the following equation.

$$\delta = H_0 \cos \omega t \cdot L/R \qquad (3),$$

where L is a distance between the light spots 15 and 16, and R is a radius on the recording medium. As shown in FIG. 4C, the track deviation amount becomes zero when the eccentricity takes an extremum (at b or d), while the eccentricity becomes a maximum $\delta max = H_0 \cdot L/R$ when the eccentricity=0 (at a or c). In a case that $H_0 = 50$ μm, $L = 20$ μm, and $R = 24$ mm, $\delta max = 0.042$ μm. It is possible to restrict to some extent the track deviation of the light spot for verification reproduction rising from the accuracy of the optical parts and/or mechanical parts, by rotation adjustment of the diffraction grating 6. On the other hand, it has been difficult to eliminate the track deviation rising from the eccentricity of the recording medium without the trapezoidal shaped prism and the rotation actuator, because the track deviation due to the eccentricity of the recording medium differs depending upon a disk and a disc radius.

SUMMARY OF THE INVENTION

The present invention has been accomplished taking into account the above problems in the conventional techniques. It is, therefore, an object of the present invention to provide an optical information recording/reproducing apparatus enabling to eliminate a track deviation of light spots due to an eccentricity of a recording medium without using a trapezoidal shaped prism and a rotation actuator, and to make a light head simple and compact. It is another object of the present invention to provide an optical information recording/reproducing apparatus which may also eliminate a track deviation except for that rising from the eccentricity of the recording medium.

The object of the present invention can be achieved by an optical information recording/reproducing apparatus in which a plurality of light beams are formed as micro light spots on an identical track or on a plurality of tracks, respectively, on an optical information recording medium to conduct recording or reproducing of information, in which there are provided means for conducting a tracking control with at least one of the plurality of light spots, means for detecting an eccentricity amount of the recording medium, means for calculating a track deviation amount of the other light spots with respect to the light spot of the tracking control based on the eccentricity amount thus obtained, position information of the light spots on the recording medium, and distance information between the light spots, and means for calculating a tracking offset amount to assign the obtained track deviation amount at a predetermined ratio to the plurality of light spots and applying the offset amount to the tracking control signal in synchronism with the eccentricity of the recording medium.

The object of the present invention can also be achieved by an optical information recording/reproducing apparatus in which a plurality of light beams are formed as micro light spots on an identical track or on a plurality of tracks, respectively, on an optical information recording medium to conduct recording or reproducing of information, in which there are provided means for conducting a tracking control with at least one of the plurality of light spots, means for detecting a relative track deviation amount of the light spot for the tracking control and the other light spots, and means for calculating a tracking offset amount to assign the obtained track deviation amount at a predetermined ratio to the plurality of light spots and applying the offset amount to a tracking control signal.

BRIEF DESCRIPTION OF THE DRAWINGS

FIG. 4A, FIG. 4B, and FIG. 4C are explanatory drawings to show an eccentricity of a recording medium in the conventional apparatus, positional relations of two light spots due to the eccentricity, and a track deviation of the light spots, respectively;

FIG. 10A, FIG. 10B, and FIG. 10C are explanatory drawings to show an eccentricity of the recording medium, an AT offset applied to a tracking control signal based on information about the eccentricity, and track deviations of a light spot for recording and erasing and of a light spot for verification reproduction when the AT offset is applied, respectively;

FIG. 13 is a block diagram to show an example of the servo signal detection circuit in the embodiment of FIG. 12;

FIG. 14A and FIG. 14B are signal wave form drawings to show cross-track signals produced by the servo signal detection circuit of FIG. 13;

DETAILED DESCRIPTION OF THE PREFERRED EMBODIMENTS

Embodiments of the present invention are explained in detail in the following with reference to the accompanying drawings.

Figure 1:
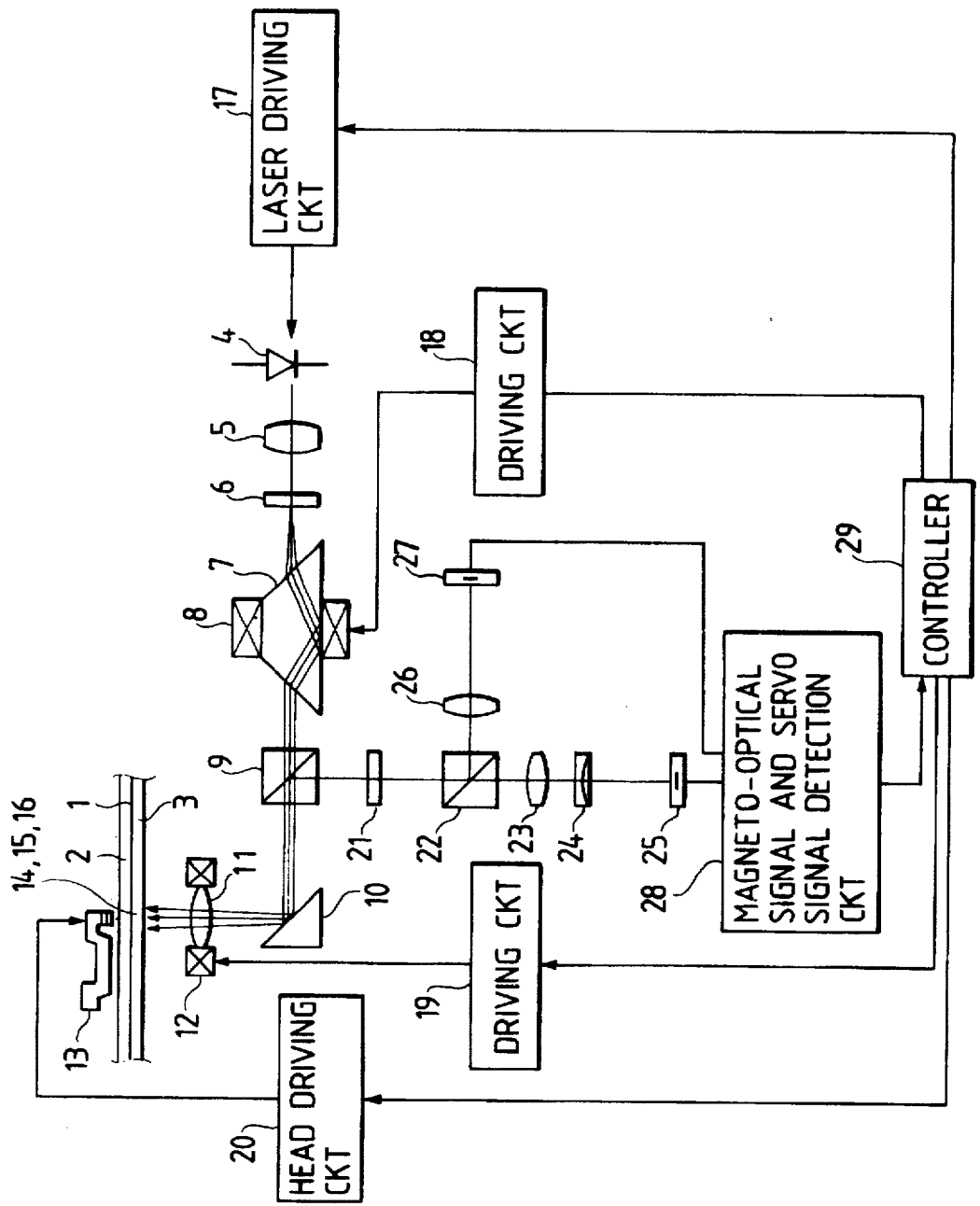
FIG. 1 is a constitutional drawing to show a conventional example of an optical information recording/reproducing apparatus.
Figure 2:
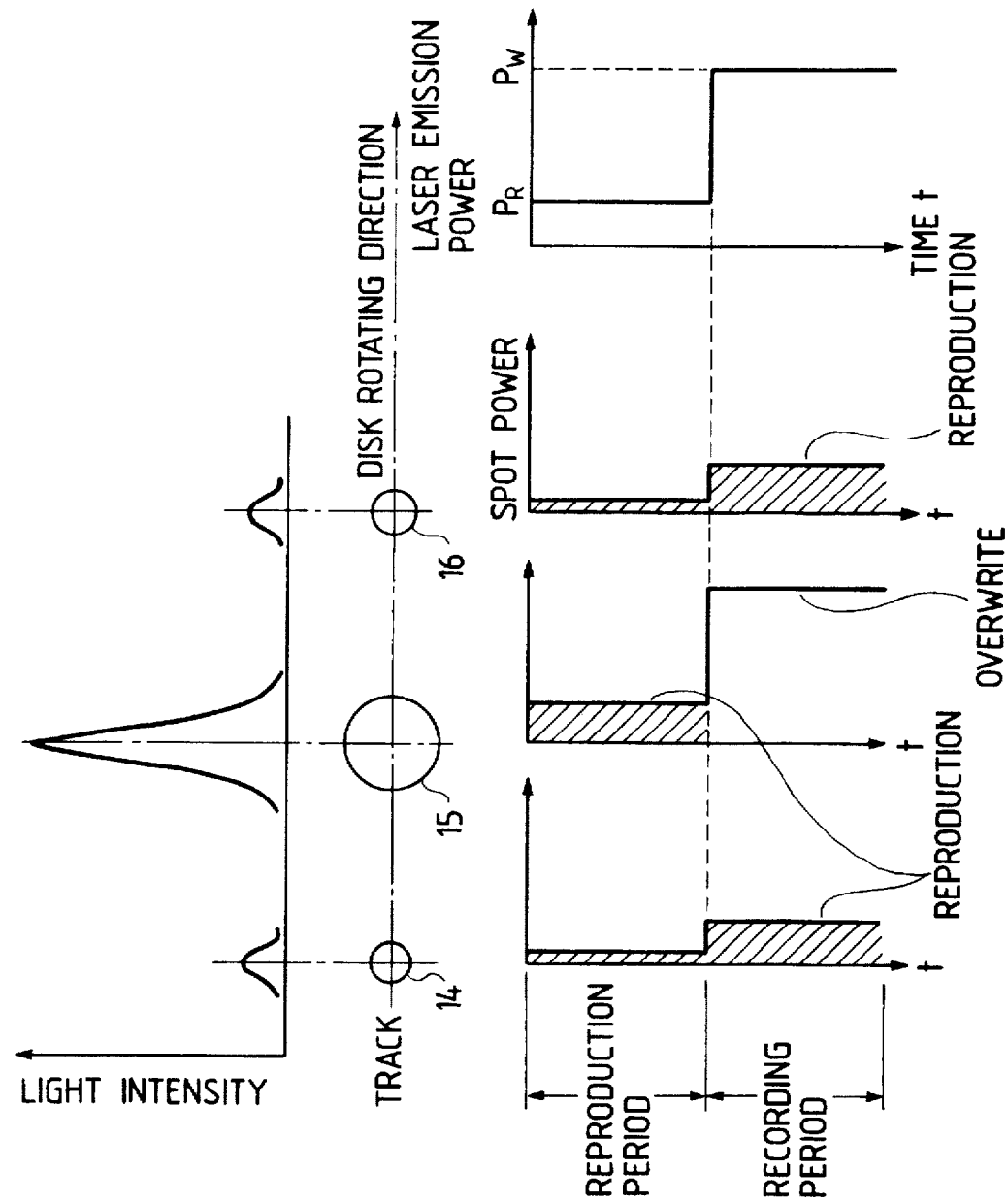
FIG. 2 is an explanatory drawing to show light spots used in the conventional apparatus as shown in FIG. 1 and an intensity of each light spot.
Figure 3:
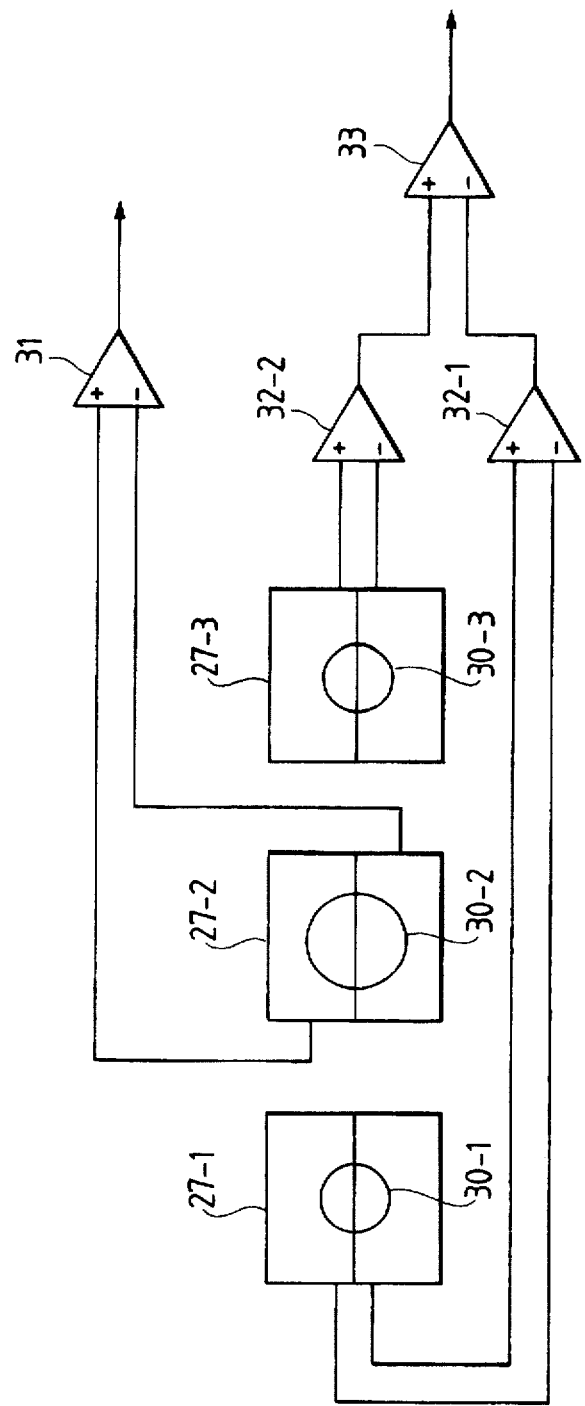
FIG. 3 is a circuit diagram to show a detection system of a tracking control signal in the conventional apparatus.
Figure 5:
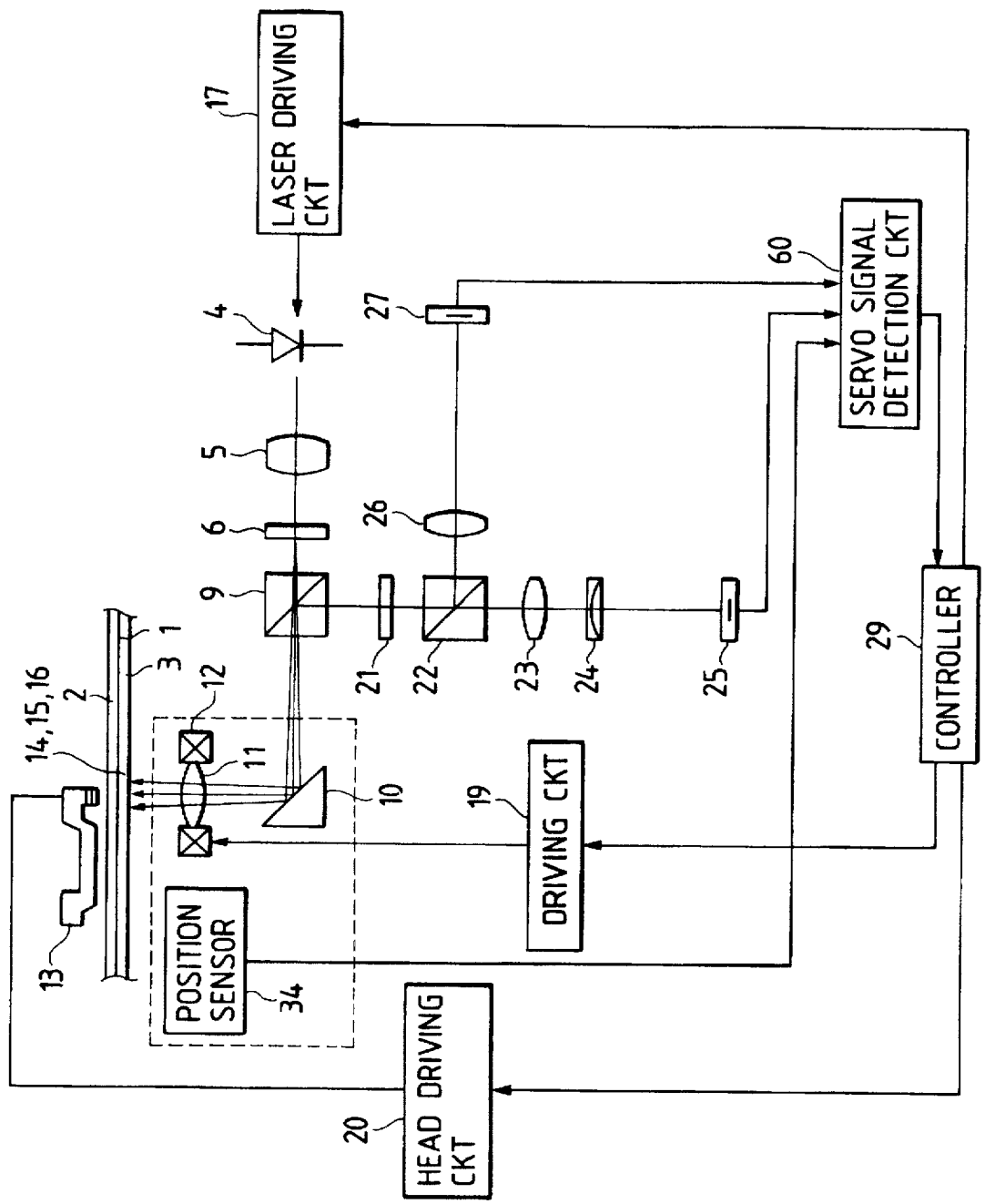
FIG. 5 is a constitutional drawing to show a first embodiment of the optical information recording/reproducing apparatus according to the present invention.

FIG. 5 is a constitutional drawing to show the first embodiment of an optical information recording/reproducing apparatus according to the present invention. In FIG. 5, the same elements are given the same numerals as in the conventional apparatus as shown in FIG. 1, and their discussion is omitted in the discussion of the present embodiment. In FIG. 5, reference numeral 34 designates a position sensor for detecting a position of the objective lens actuator 12 in the tracking direction. An output signal of the position sensor 34 is sent to a servo signal detection circuit 60 to detect an eccentricity amount of the recording medium 1. In the servo signal detection circuit 60, a tracking offset, as will be referred to as an AT offset, is calculated based on eccentricity information obtained, and is then applied to a tracking control signal. A specific circuit constitution and operation for the tracking control will be discussed in detail later. Further, the present embodiment does not use the trapezoidal shaped prism and the rotation actuator as provided in the conventional apparatus, whereby the constitution of the apparatus may be simplified. In the present embodiment, the eccentricity amount of the recording medium 1 is detected by forming three light spots 14, 15, 16 on a certain track on the recording medium through the objective lens 11 and detecting a displacement of the objective lens 11.

Figure 6:
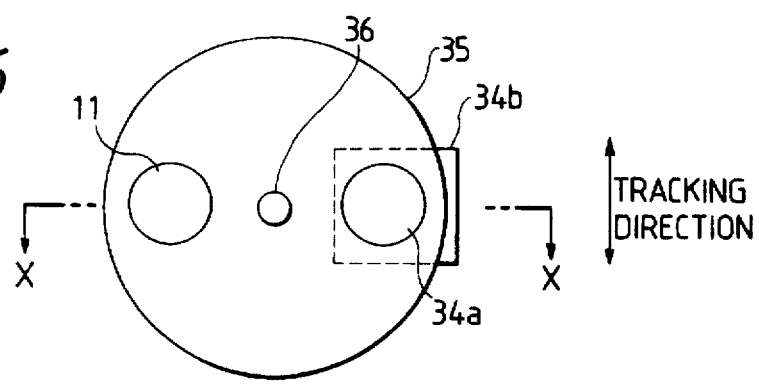
FIG. 6 is a plan view to show a position sensor and an objective lens in the embodiment of FIG. 5, and a holding structure thereof.
Figure 7:
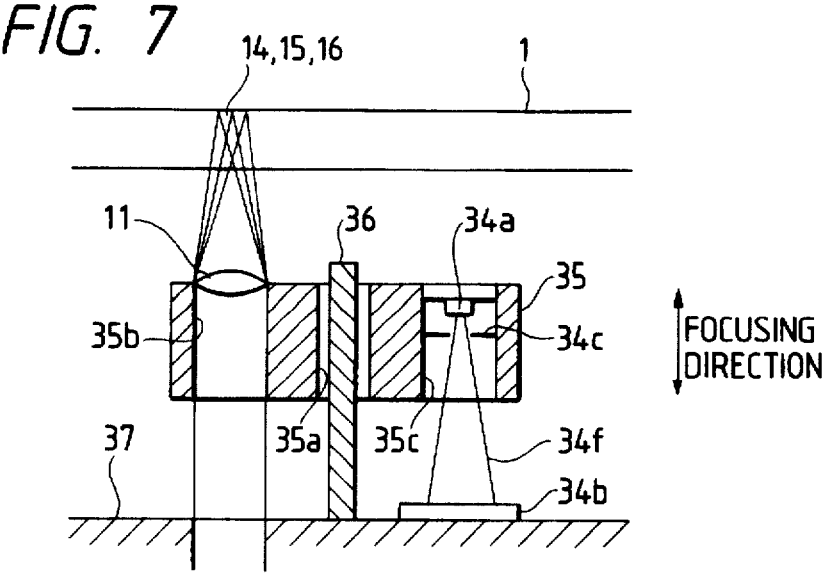
FIG. 7 is a cross-sectional drawing along line X—X in FIG. 6.

FIG. 6 is a plan view to show the position sensor 34 and the objective lens 11 encircled by a broken line in FIG. 5, together with a holding structure thereof, and FIG. 7 is a cross-sectional view along line X—X line in FIG. 6. In these figures, numeral 35 denotes a cylindrical holding member for holding the objective lens 17 and the position sensor 34. The holding member 35 is made of a carbon fiber reinforced resin. A through hole 35a is perforated through a central portion of the holding member 35 to receive a shaft 36. The objective lens 11, and a light emitting device 34a constituting a part of the position sensor 34 are secured to the holding member 35 such that the shaft 36 intervenes between the objective lens 11 and the light emitting device 34a. Through holes 35b and 35c are provided beneath the objective lens 11 and beneath the light emitting device 34a on the holding member 35, respectively, for light passage. The holding member 35 is so structured that it may rotate about the shaft secured to the actuator base 37 through a magnetic circuit constituted by an unrepresented magnet and coil thereby to move in the tracking direction, and that it may also slide in the focus direction.

Figure 8:
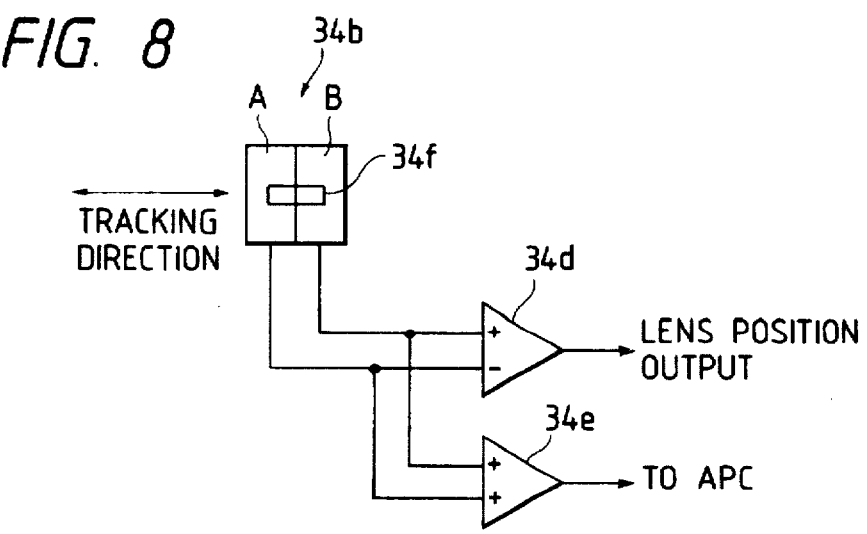
FIG. 8 is a circuit diagram to show a circuit for producing a lens position output from a detection signal of the position sensor in the embodiment of FIG. 5.

A two-divided light receiving element 34b for receiving emitted optical fluxes is fixed on the actuator base 37 below the light emitting device 34a. The light emitting element 34a and the two-divided light receiving element 34b constitute the position sensor 34. Light emitted from the light emitting device 34a is shaped in a proper form through a slit 34c provided in the through hole 35c of the holding member 35, and the shaped light enters the two-divided light receiving element 34b. The position sensor 34 is symmetrically positioned with the objective lens 11 with respect to the shaft 36 while also serving as a counter weight. Two outputs of the two-divided light receiving element 34b are supplied to a differential amplifier 34d for detecting a lens position and to a summing amplifier 34e for detecting a light amount of the light emitting device 34a as shown in FIG. 8. The two-divided light receiving element 34b is divided into two pieces of detector A and detector B aligned perpendicular to the tracking direction. In FIG. 8, the light incident into the two-divided light receiving element 34a is represented by 34f, which is shaped in a rectangular optical flux by the slit 34c. Output signals of the two detectors A, B of the two-divided light receiving element 34b are sent to the differential amplifier 34d, which produces thereby a difference signal. In this case, since the two-divided light receiving element 34b is divided into two perpendicular to the tracking direction, the position of the light emitting device 34a with respect to the actuator base 37 may be attained from the output signal of the differential amplifier 34d. In detail, once two outputs of the detectors A, B are adjusted to be equal to each other when the center of the objective lens 11 becomes coincident with the optical axis of the laser optical flux (with no eccentricity), a lens position output may be obtained in proportion to the position of the objective lens 11 when moved with an eccentricity with the spot 34f on the two-divided light receiving element 34b moving together. Accordingly, effecting a tracking servo using the light spot 15 for recording and erasing while making the objective lens actuator 12 follow the eccentricity of the recording medium by using the objective lens position output, the eccentricity of the recording medium may be attained from the objective lens position output.

Figure 9:
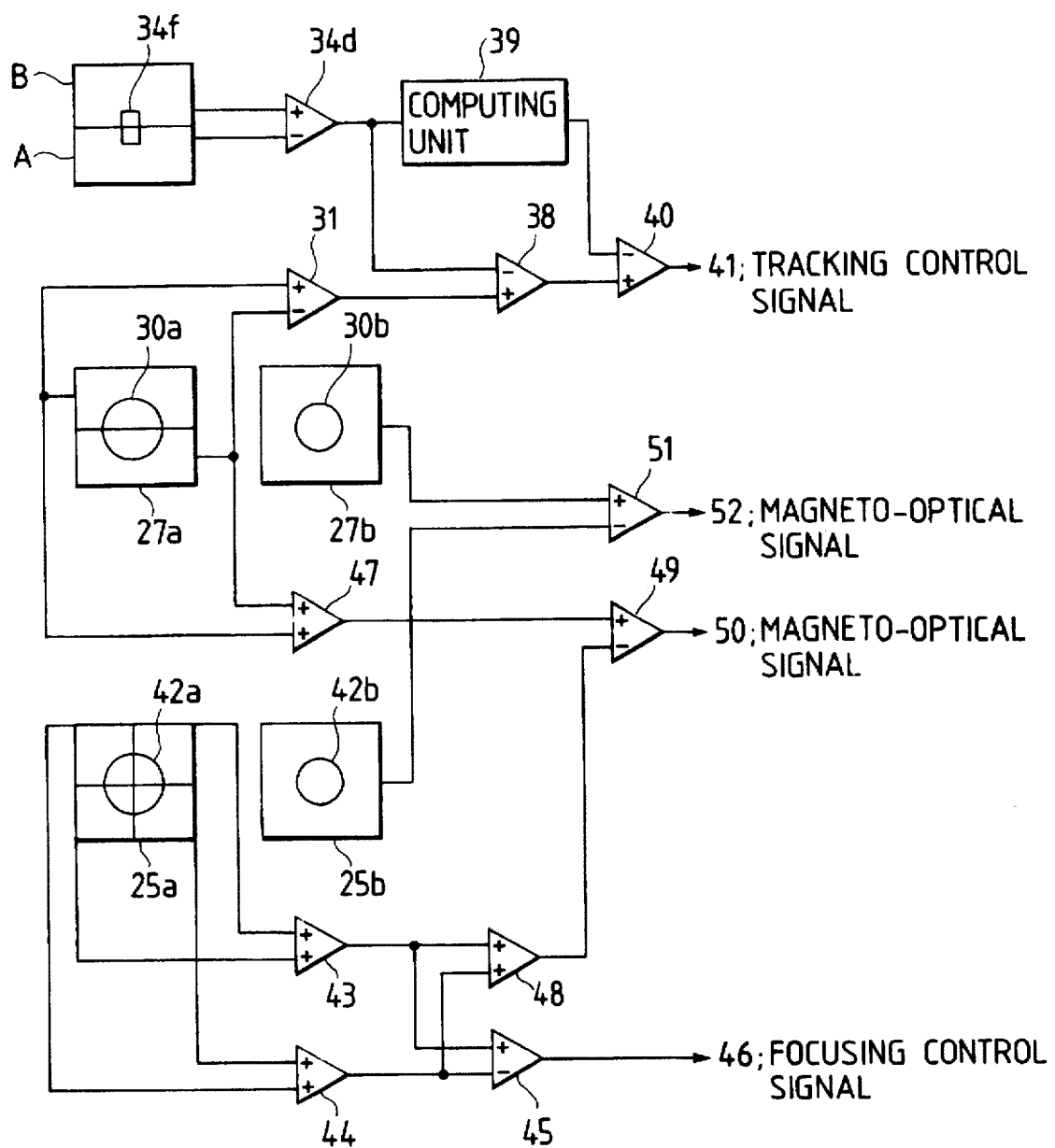
FIG. 9 is a circuit diagram to show an example of a servo signal detection circuit for producing a tracking control signal, a focus control signal, and a magneto-optical signal in the embodiment of FIG. 5.

FIG. 9 is a circuit diagram to show an example of a construction of the servo control circuit for tracking control of the light spot 15 for recording and erasing and the light spot 16 for verification reproduction as described with eccentricity information of the recording medium being obtained from the lens position output. This circuit is provided in the servo signal detection circuit 60 as shown in FIG. 5. In FIG. 9, 30a and 30b are light spots condensed by the condenser lens 26 on the photo detector 27 from the optical fluxes reflected by the polarized light beam splitter 22. The light spot 30a is a reflection light of the light spot 15 for recording and erasing from the medium surface, and the light spot 30b is a reflection light of the light spot for verification reproduction from the medium surface. The photo detector 27 comprises photo detectors 27a and 27b. The photo detector 27a is divided into two to conduct the tracking control using a push-pull method with the light spot 30a. Accordingly, precise positioning of the photo detector 27 may be sufficiently achieved only with the light spot 30a. An output signal of the photo detector 27a is sent to the differential amplifier 31.

The aforementioned lens position output from the differential amplifier 34d is output to a computing unit 39, and the computing unit 39 calculates an eccentricity amount of the recording medium based on the lens position output and stores a result obtained in an internal memory thereof. A specific operation of the computing unit 39 is explained below with reference to FIGS. 10A–10C. First, the semiconductor laser 4 is turned on to provide the light spot 15 for recording and erasing of reproduction power in such a state that the computing unit 39 has no eccentricity information of the recording medium, and the objective lens actuator 12 is made to follow the eccentricity of the recording medium in the ordinary push-pull method to conduct the tracking control. When the objective lens actuator 12 follows the eccentricity of the recording medium in such a state, eccentricity information of the recording medium may be obtained from the output of the differential amplifier 34d. The eccentricity amount is $H_0 \sin\omega t$ as shown in FIG. 10A. The computing unit 39 takes in the eccentricity amount and differentiates it to calculate a quantity $H_0 \cos\omega t$ proportional to the track deviation of the light spot 16 for verification reproduction. The computing unit 39 also obtains from address information preliminarily formatted on the recording medium a distance L between the light spots 15 and 16 on the recording medium, which is determined by the construction of the light head, and a radius R on the recording medium where the light spots 15 and 16 are located. The computing unit 39 calculates a track deviation amount $\delta$ of the light spot 16 at a radial position thereof with reference to the light spot 15. The track deviation amount $\delta$ may be obtained by the following equation.

$$\delta = H_0 \cos \omega t \cdot L/R \tag{4}$$

Once the computing unit 39 takes in the eccentricity information, the unit 39 may calculate the track deviation amount of the light spot 16 in accordance with a radius R of a track on the recording medium to which the light head is making access, because the eccentricity amount is independent of the radius R.

It is preferable that both the track deviations of the light spots 15 and 16 become as small as possible in order to conduct stable recording/erasing and reproducing of information. Thus, the track deviation of equation (4) caused by the eccentricity of the recording medium is properly separated at a predetermined ratio to be assigned to the two light spots in overwriting. For example, if an AT offset of a half of the equation (4) is applied as shown in FIG. 10B to the light spot 15 in synchronism with the rotation, i.e., with the eccentricity of the recording medium, respective track deviations of the light spots become as shown in FIG. 10C. In this example, the following equations represent the applied AT offset, the track deviation $\delta_1$ of the light spot 15 for recording and erasing, and the track deviation $\delta_2$ of the light spot 16 for verification reproduction.

$$AT\ \text{offset} = -H_0 \cos \omega t \cdot L/2R \tag{5}$$

$$\delta_1 = -H_0 \cos \omega t \cdot L/2R \tag{6}$$

and $$\delta_2 = H_0 \cos \omega t \cdot L/2R \tag{7}$$

If $H_0 = 50$ µm, $L = 20$ µm, and $R = 24$ mm, the maximum track deviation of each light spot is 0.021 µm.

As described, the AT offset calculated by the computing unit 39 is output to the differential amplifier 40, and is then applied to the aforementioned tracking control signal output from the differential amplifier 31. Of course, the application of the AT offset is necessary only in overwriting, but unnecessary in the ordinary reproduction. Incidentally, there is provided a differential amplifier 38 between the differential amplifiers 31 and 40, which is to cancel an AT offset peculiar to the push-pull method, generated depending upon the position of the objective lens 11 in the tracking direction. The AT offset is always applied to the tracking control signal from the differential amplifier 31. The differential amplifier 40 produces a tracking control signal 41 of a difference between the tracking control signal from the differential amplifier 31 and the AT offset value from the computing unit 39, and outputs the control signal 41 to the drive circuit 19. The drive circuit 19 drives the actuator based on the tracking control signal so as to control the objective lens 11. By this, the two light spots 15, 16 follow a track with a sufficient accuracy irrespective of the eccentricity of the recording medium to conduct the recording and verification of information.

A recording/reproducing signal level decreases in general in proportion to a square of the track deviation. In the present embodiment, a signal decrease of the light spot 16 for verification reproduction may be made half as compared to the arrangement without application of the aforementioned AT offset to the light spot 15 for recording and erasing. The effect is especially outstanding for the recording medium with guide grooves with regard to the signal decrease due to the track deviation. The assigning ratio of the track deviation caused by the eccentricity of the recording medium to the two light spots may be arbitrarily changed depending upon properties of the recording medium to be used.

In FIG. 9, 42a and 42b are light spots converged from the optical fluxes passed through the polarized light beam splitter 22 and then through the condenser lens 23 and cylindrical lens 24 onto the photo detector 25. The light spot 42a is a reflection light of the light spot 15 for recording and erasing from the medium surface, and the light spot 42b is a reflection light of the light spot 16 for verification reproduction from the medium surface. The photo detector 25 comprises photo detectors 25a and 25b. The photo detector 25a is divided into four to conduct focusing using an astigmatic method. Adders 43, 44 calculate diagonal sums of the four-split photo detector 25a, and a differential amplifier 45 calculates a difference thereof to obtain a focusing control signal 46. The focusing control signal 46 is output to the drive circuit 19, which performs a focusing control of the objective lens 11 by driving it in the focusing direction. In addition, magneto-optical signals are produced from the output signals of the photo detectors 27 and 25. In detail, in the ordinary reproduction, a magneto-optical signal 50 is produced from the light spot 15 by obtaining the signal from the light spot 42a through the adder 44 adding the outputs of the adders 43, 44, and the signal from the light spot 30a through the adder 47, and by obtaining a difference of the thus-obtained signals through the differential amplifier 49. In overwriting, a magneto-optical signal 52 is produced by obtaining a difference of the signals from the light spots 42b and 30b through the differential amplifier 51.

Figure 11:
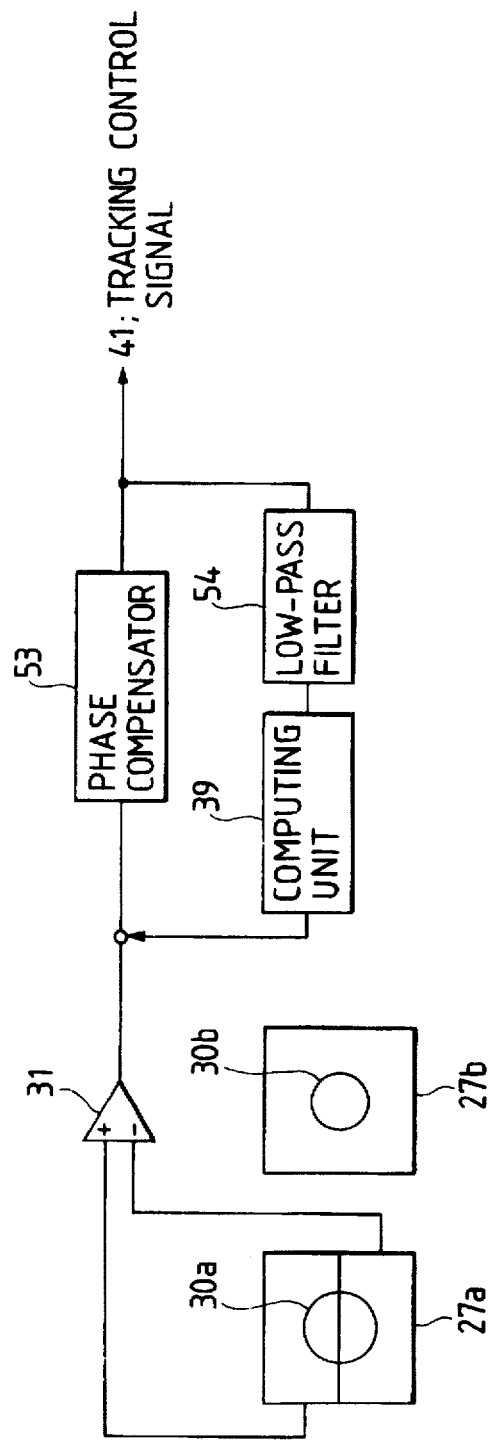
FIG. 11 is a constitutional drawing to show a second embodiment according to the present invention.

FIG. 11 is a block diagram to show the second embodiment according to the present invention. This embodiment is an example in which the eccentricity information of the recording medium is obtained from a low frequency component of the tracking control signal instead of using the position sensor of the objective lens. FIG. 11 shows only a portion different from the arrangement of the embodiment as shown in FIG. 9. In FIG. 11, reference numeral 31 designates a differential amplifier for producing a tracking control signal from a reception signal of a light spot 30a detected by a two-divided photo detector 27a as described above. An output of a differential amplifier 31 is supplied to a phase compensator 53, and an output of the phase compensator 53 after phase compensation is sent to a low-pass filter 54. When the tracking control signal phase-compensated by the phase compensator 53 is passed through the low-pass filter 54, an output proportional to the eccentricity of the recording medium may be obtained from a low frequency component of the tracking control signal. The computing unit 39 calculates an AT offset in the same manner as described above based on the eccentricity information of the recording medium from the filter output, and applies the AT offset value thus obtained to the tracking control signal. This embodiment is advantageously employed for a case of an actuator which has a restoring force toward an original position of the objective lens (a position where the eccentricity of the recording medium is zero) when the objective lens 11 follows the eccentricity of the recording medium, specifically for an actuator of a spring type.

Figure 12:
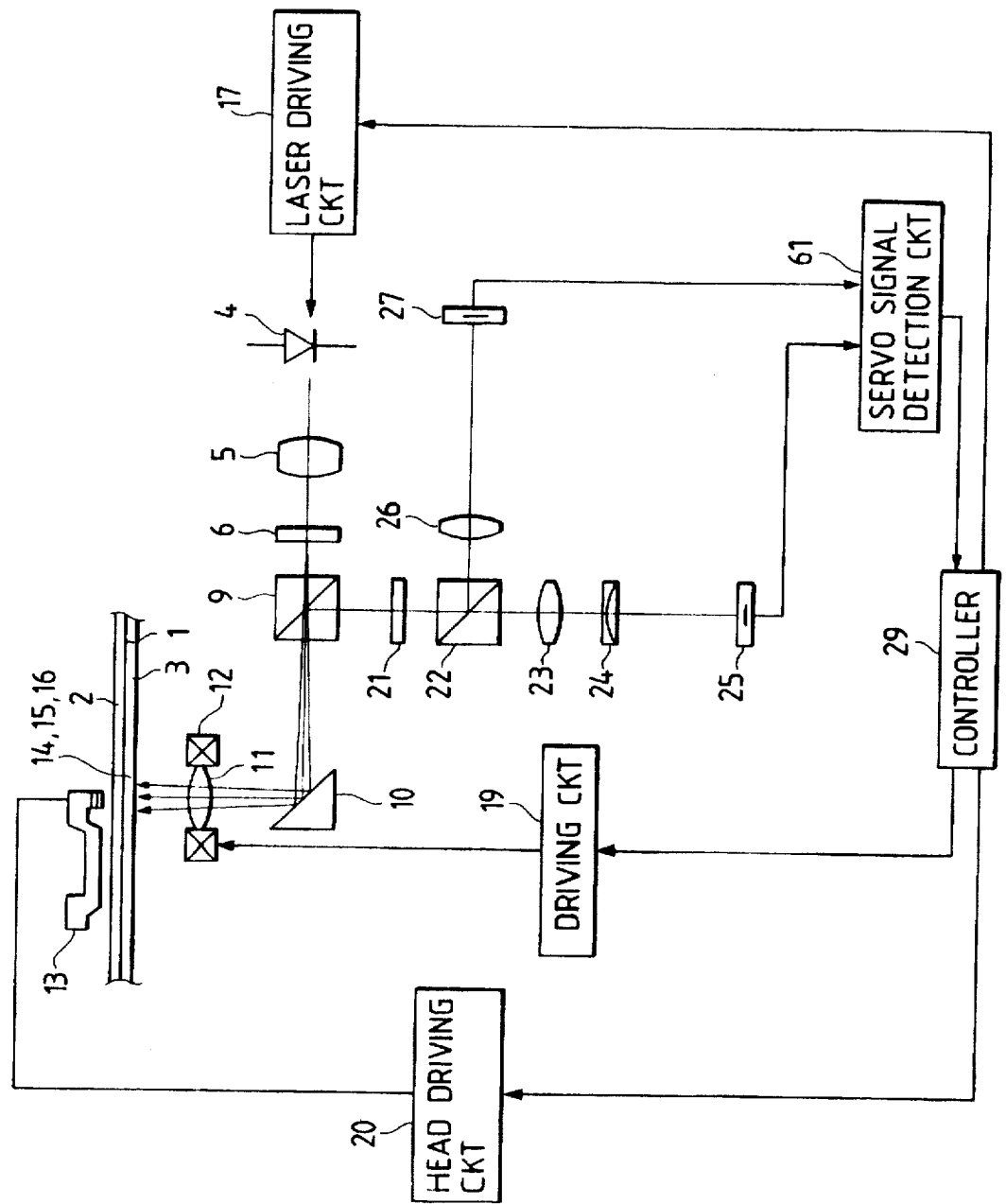
FIG. 12 is a constitutional drawing to show a third embodiment according to the present invention.

FIG. 12 is a block diagram to show the third embodiment according to the present invention. The above embodiments are examples to prevent the track deviation of the light spots caused by the eccentricity of the recording medium by detecting the track deviation amount due to the eccentricity, while the present embodiment is an example to prevent a track deviation irrespective of the eccentricity of the recording medium by detecting a track deviation amount thereof. In FIG. 12, the same elements are given the same numerals as in the embodiment as shown in FIG. 5. In the present embodiment, optical fluxes of the semiconductor laser 4 are diffracted into three diffraction beams of zero-order and ±first-order by the diffraction grating 6 in the same manner as in the conventional apparatus, and the respective optical fluxes thus diffracted form images of micro light spots on an information recording medium 1 through the condensing effect of the objective lens 11. A magneto-optical disk is used as the information recording medium 1. Light spots 14, 15, 16 are formed on an identical track on the disk in the named order from the upstream direction. The light spot 15 is used as a light spot for recording and erasing, and the light spot 16 is used as a light spot for verification reproduction immediately after recording. Numeral 61 denotes a servo signal detection circuit for detecting a servo signal for focus control and tracking control and for detecting a magneto-optical signal or reproduction signal based on signals detected by the photo detectors 25 and 27. The servo signal detection circuit 61 functions to make the two light spots 15, 16 follow a track with a sufficient accuracy as will be explained in detail later. Similar to the embodiment of FIG. 5, the present embodiment also excludes the trapezoidal shaped prism and the rotation actuator as used in the conventional apparatus, whereby the constitution of the apparatus may be simplified.

FIG. 13 is a block diagram to show a specific example of a construction of a tracking servo system in the servo signal detection circuit 61. In FIG. 13, numeral 27 is a photo detector as shown in FIG. 12. Light spots 30a and 30b are condensed from optical fluxes reflected by the polarized light beam splitter 22 through the condenser lens 26 onto the photo detector 27. The light spot 30a is a reflection light of the light spot 15 for recording and erasing from the medium surface, the light spot 30b is a reflection light of the light spot 16 for verification reproduction from the medium surface. The photo detector 27 comprises photo detectors 27a and 27b. The photo detector 27a is divided into two to conduct a tracking control using a push-pull method with the light spot 30a. Accordingly, precise positioning of the photo detector 27 may be properly effected only with the light spot 30a. Output signals of the photo detector 27a are sent to a differential amplifier 31 in the servo signal detection circuit 61, which produces a tracking control signal (AT signal) 62.

Figure 15A:
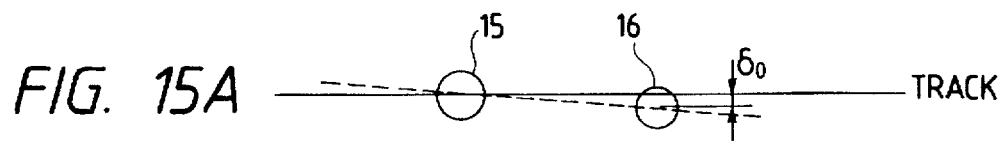
FIG. 15A and FIG. 15B are explanatory drawings to show deviation states of two light spots with respect to a track without and with application of the AT offset, respectively, in the embodiment of FIG. 12.

The output signals of the photo detector 27a are also sent to an adder 63, and the adder 63 produces a cross-track signal 64, which is a sum signal of the two-divided photo detector 27a. An output signal of the photo detector 27b is output as a cross-track signal 65. In the present embodiment, a relative position deviation of the two light spots 15, 16 in the radial direction is detected from the two cross-track signals 64, 65. FIG. 14A and FIG. 14B are drawings to show respective signal wave forms of the cross-track signals 64, 65, in which the horizontal axis represents a time and the vertical axis a signal output. FIGS. 14A and 14B show the cross-track signals 64, 65 in a case that the focus servo is effective on the light spots 15, 16, that the tracking servo loop is open, and then that the light spots 15, 16 are crossing a track because of the eccentricity of the recording medium 1. In FIG. 14A, $I_L$ represents a signal level of the cross-track signal 64 when the light spot 15 is on a track land, and $I_G$ a signal level of the cross-track signal 64 when the light spot 15 is on a groove. Further in FIGS. 14A and 14B, a timing corresponding to a track land is shown by a solid line L, and a timing corresponding to a groove by a broken line G. Also in FIG. 14B, $I_L'$ represents a signal level of the cross-track signal 65 when the light spot 16 is on a track land, and $I_G'$ a signal level of the cross-track signal 65 when the light spot 16 is on a groove. As apparent from FIGS. 14A and 14B, the cross-track signals 64, 65 change in sinusoidal wave respectively with a constant period T, and a time deviation $\delta_t$ exists between them. The time deviation $\delta_t$ rises from a relative position deviation $\delta_0$ of the light spots 15, 16 with respect to an arbitrary track. FIG. 15A shows a positional relation of the light spots 15 and 16 on the medium surface. If a distance between the light spots 15 and 16 is about 20 µm on the medium surface, the deviation amount $\delta_0$ may be limited to about 0.1 µm by rotation adjustment of the diffraction grating 6. However, if the tracking servo is effected on the light spot 15 in this state, the light spot 16 would be deviated by the track deviation $\delta_0$, which cannot ensure stable verification reproduction of information.

The above cross-track signals 64, 65 are output to a computing unit 66 as shown in FIG. 13. The computing unit 66 detects the period T and the time deviation $\delta_t$ of the cross-track signals, and calculates the track deviation $\delta_0$ of the light spot 15 and 16 from a detection result thereof. The track deviation $\delta_0$ may be obtained by the following equation.

$$\delta_0 = P \cdot \delta_t / T \tag{8}$$

In the equation (8), P denotes a track pitch. The computing unit 66 further calculates a tracking offset (AT offset) $A_0$ using the track deviation thus obtained. The tracking offset $A_0$ may be obtained by solving the following equation.

$$-\delta_0/2 = -\delta_t \cdot P/2T = P/2\pi \sin^{-1}(2A_0/A) \tag{9}$$

Then the tracking offset $A_0$ is as follows.

$$A_0 = -A/2 \cdot \sin(\pi \delta_t/T) \tag{10}$$

Figure 15B:
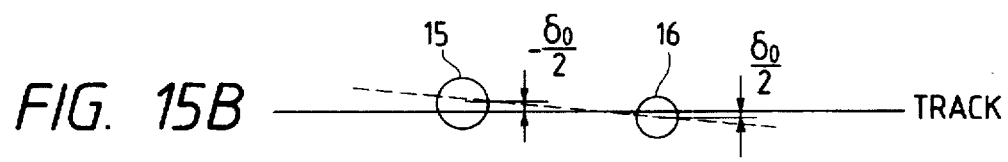
Figure 16A:
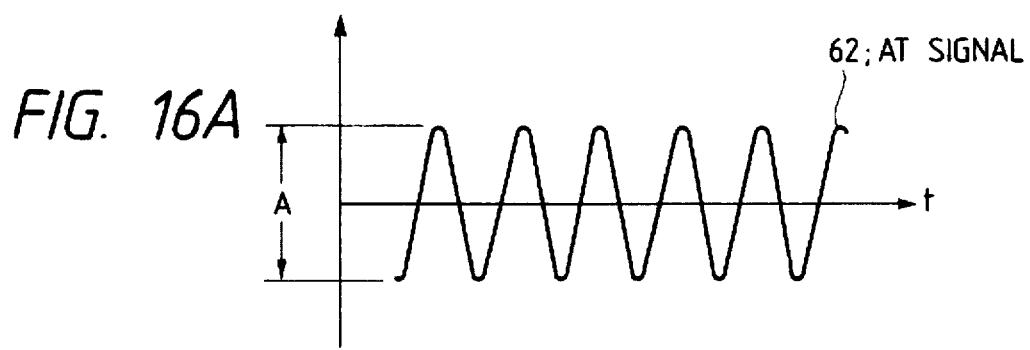
FIG. 16A and FIG. 16B are signal wave form drawings to show an AT signal produced by the servo signal detection circuit of FIG. 13 and an AT signal with application of the AT offset, respectively.
Figure 16B:
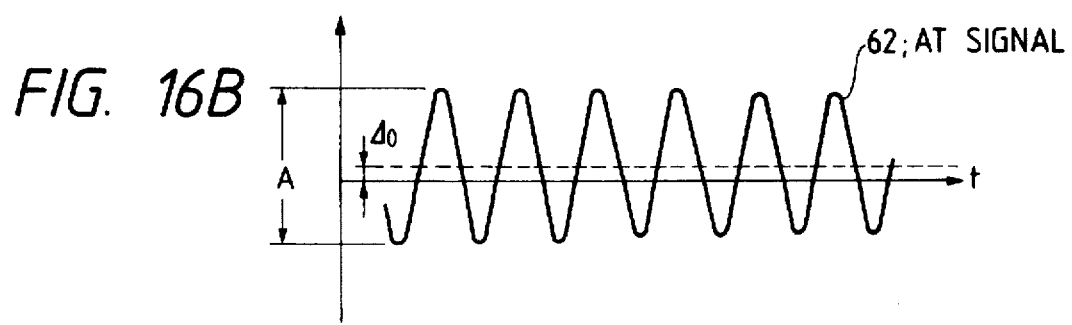

In the equation (10), A designates an amplitude level (PP value) of the AT signal, which is preliminarily obtained by an unrepresented computing unit. The thus-obtained AT offset $A_0$ is applied to the AT signal 62 from the differential amplifier 31 as explained hereinbefore. FIG. 16B shows the AT signal 62 to which the AT offset $A_0$ is applied. FIG. 16A shows the AT signal 62 to which the AT offset is not applied. When the tracking servo is effected on the light spot 15 while the AT offset $A_0$ is applied to the AT signal 62, the track deviation $\delta_0$ is equally assigned to the two light spots 15, 16 as shown in FIG. 15B, whereby the two light spots 15 and 16 follow the track with a sufficient accuracy.

A recording/reproducing signal level decreases in general in proportion to a square of the track deviation. In the present embodiment, a signal decrease of the light spot 16 for verification reproduction may be made half as compared with a case without application of the AT offset to the light spot 15 for recording and erasing. This effect is especially outstanding on a recording medium with guide grooves. The assigning ratio of the track deviation to the two light spots may be arbitrarily changed depending upon properties of the recording medium to be used. The application of the AT offset is necessary only in overwriting, but unnecessary in the ordinary reproduction.

Figures 17A, 17B:
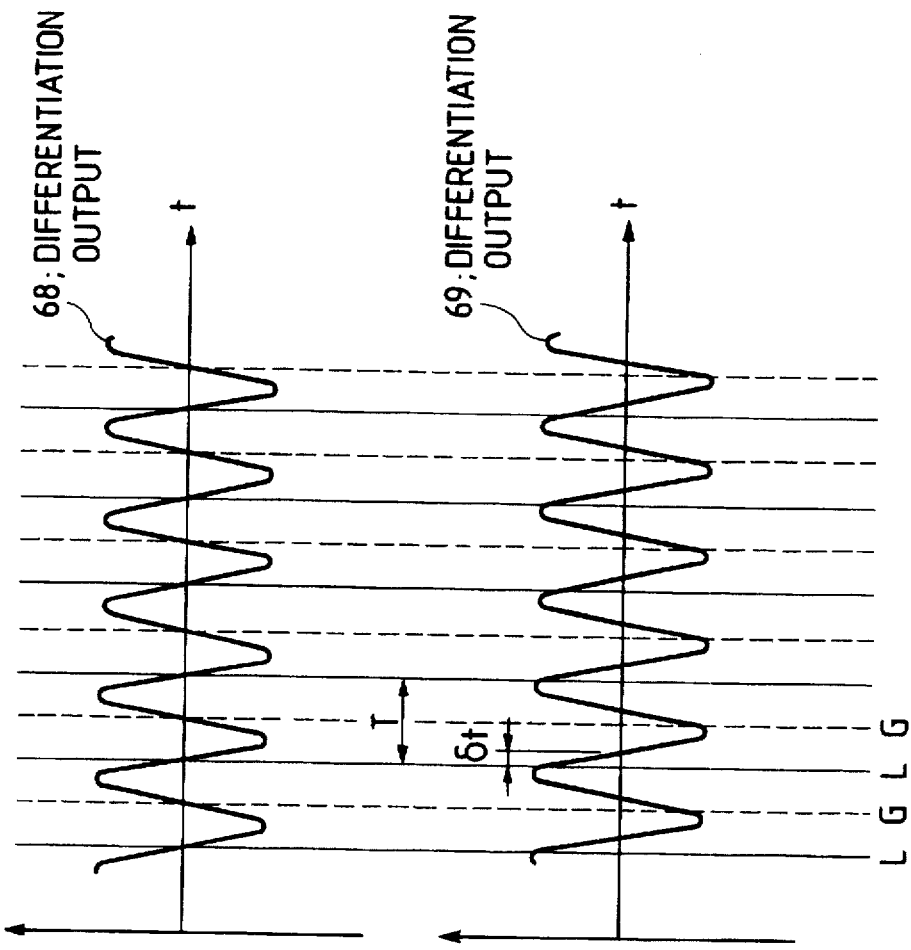
FIG. 17A and FIG. 17B are signal wave form drawings to show differentiation outputs of the cross-track signals differentiated by differentiating circuits in the servo signal detection circuit of FIG. 13.

In a case that the computing unit 66 detects the period T and the time deviation $\delta_t$ from the two cross-track signals, it is preferable that differentiating circuits 67a, 67b are provided before the computing unit 66 as shown in FIG. 13 to detect the period and the time deviation using differentiation outputs therefrom. FIG. 17A and FIG. 17B are drawings to show wave forms of the differentiation outputs. FIG. 17A shows a wave form obtained by differentiating the cross-track signal 64 in the differentiating circuit 67a, and FIG. 17B shows a wave form obtained by differentiating the cross-track signal 65 in the differentiating circuit 67b. In FIGS. 17A and 17B, a timing corresponding to a track land is shown by a solid line L, and a timing corresponding to a groove by a broken line G. As apparent from FIGS. 17A and 17B, the timings of the track lands and grooves cross at zero when the respective cross-track signals are differentiated, whereby the period T and the time deviation $\delta_t$ may be readily detected.

Figure 18A:
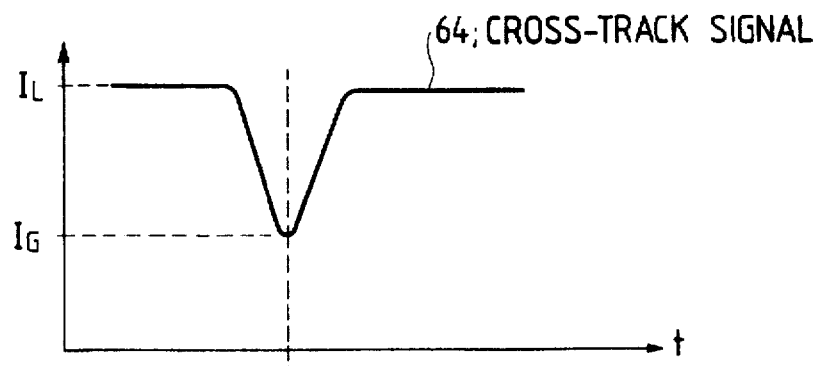
FIG. 18A and FIG. 18B are signal wave form drawings to show cross-track signals in the servo signal detection circuit of FIG. 13 when the light spots cross a track (in one track jump)
Figure 18B:
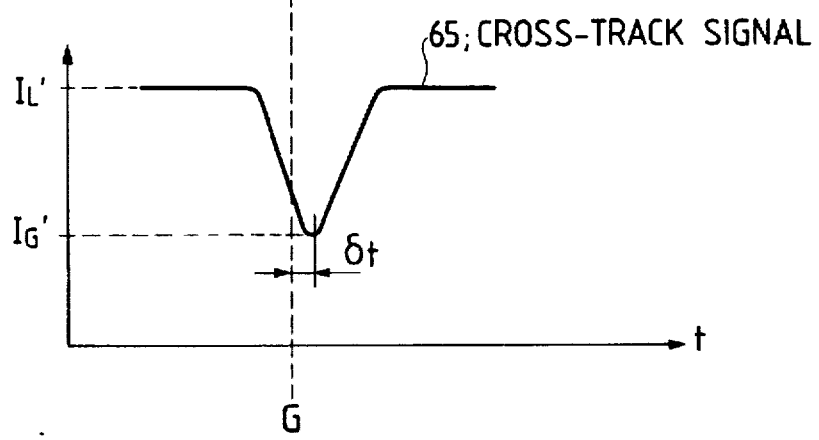
Figure 19A:
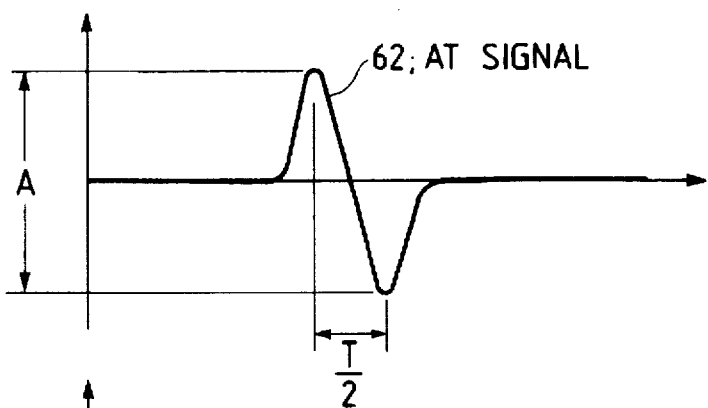
FIG. 19A and FIG. 19B are signal wave form drawings to show an AT signal in the servo signal detection circuit of FIG. 13 when the light spots cross a track (in one track jump) and an AT signal with application of the AT offset, respectively.
Figure 19B:
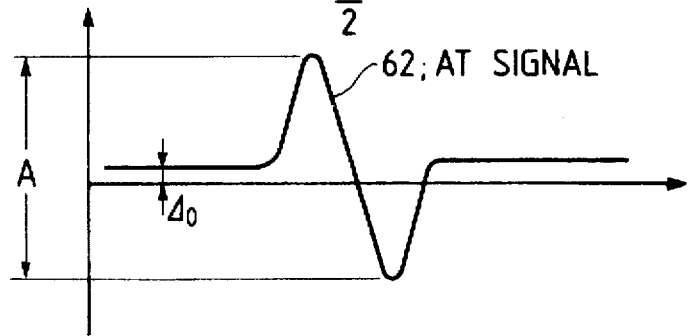
Figure 20A:
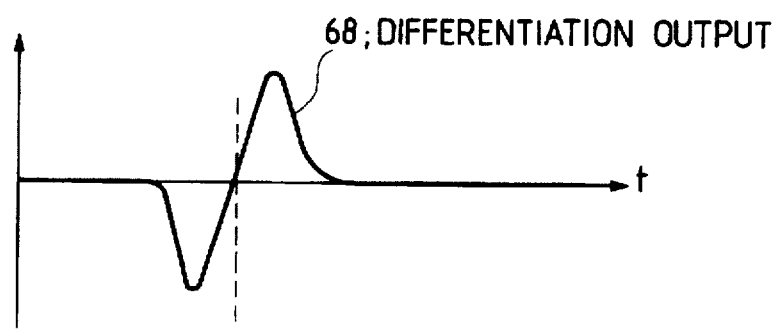
FIG. 20A and FIG. 20B are signal wave form drawings to show differentiation outputs of the differentiating circuit in the servo signal detection circuit of FIG. 13 when the optical spots cross a track (in one track jump)
Figure 20B:
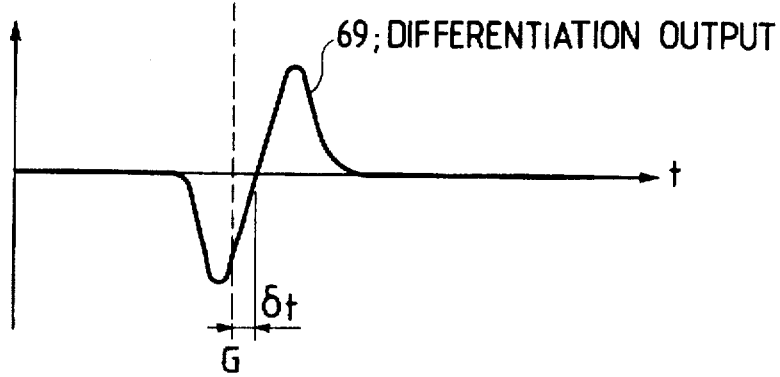

The relative track deviation $\delta_0$ of the two light spots 15, 16 may be detected in another detection method different from the above. For example, the tracking servo loop is made open at a predetermined timing while the focus servo and the tracking servo are effective on the two light spots, and the light spots are jumped to a next track (one track jump). The relative track deviation may be detected from cross-track signals in one track jump. FIG. 18A shows a wave form of the cross-track signal 64 in one track jump, and FIG. 18B a wave form of the cross-track signal 65 in one track jump. Also in FIGS. 18A and 18B, a timing of the light spot 15 on a groove is represented by a broken line G. The time deviation $\delta_t$ may also be detected from the cross-track signals 64, 65 in one track jump as described. In this case, the amplitude level A and a period T of the AT signal are to be obtained by another computing unit. FIG. 19A shows an AT signal 62 preliminarily obtained, an amplitude level A and a period T of which are stored in an unrepresented memory. The computing unit 66 calculates an AT offset $A_0$ by the above-described equation (10) using the thus-obtained time deviation $\delta_t$, the period T, and the amplitude level A. Then, the thus-obtained AT offset $A_0$ is applied as shown in FIG. 19B to the AT signal 62, and the track deviation $\delta_0$ is equally assigned to the two light spots 15 and 16 similarly as above. FIG. 20A and FIG. 20B show differentiation outputs 68, 69 obtained by differentiating the cross-track signals 64 and 65 in the differentiating circuits 67a, 67b. In detection of the time deviation $\delta_t$, the detection is easy with the use of differentiation outputs as described above.

Figure 21:
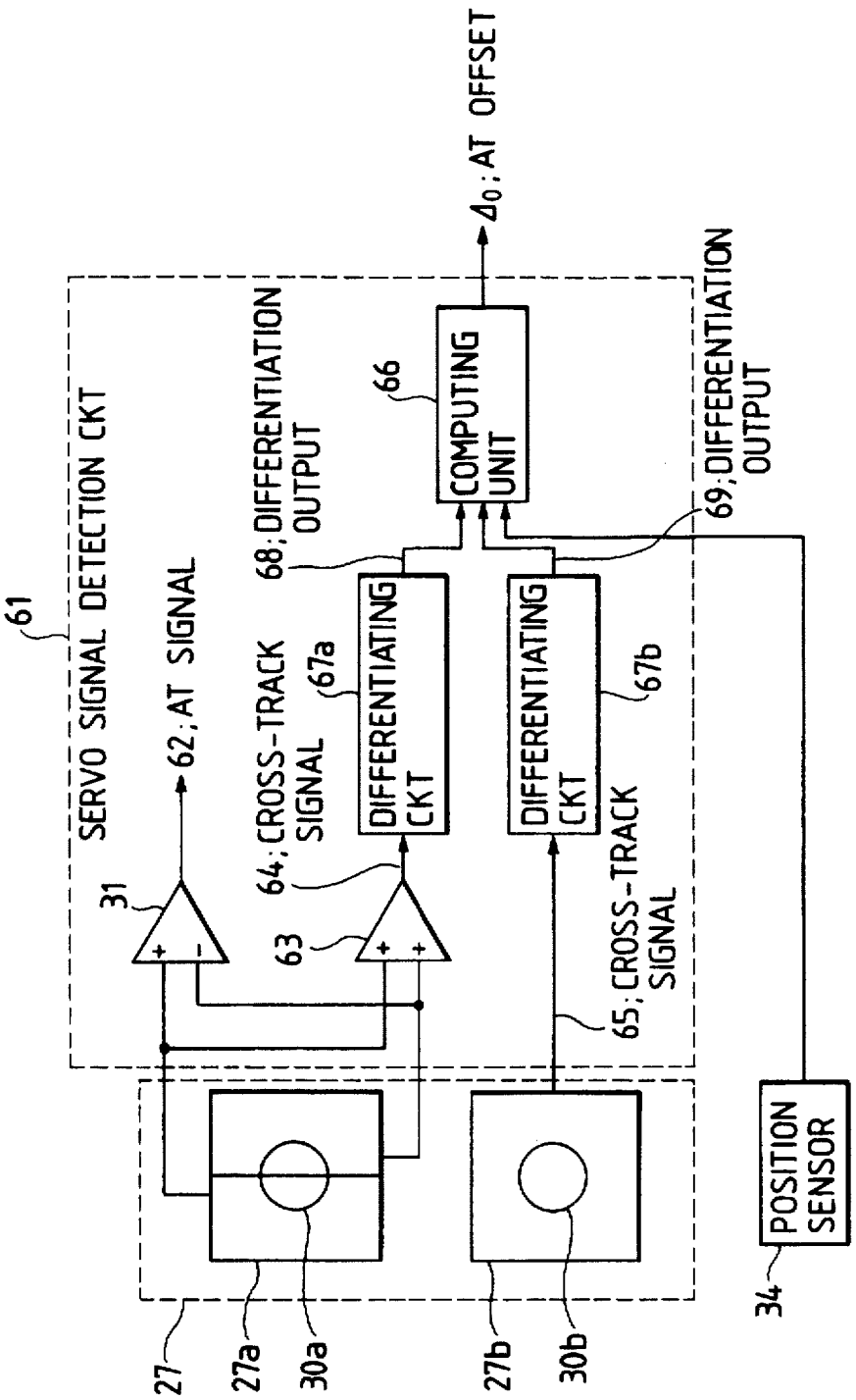
FIG. 21 is a block diagram to show a fourth embodiment according to the present invention.

FIG. 21 is a block diagram to show the fourth embodiment according to the present invention, in which the output of the position sensor 34 as described in the first embodiment of FIG. 5 is taken in to reduce influence from the position deviation of the two light spots 15, 16 in the radial direction caused by the eccentricity of the recording medium, whereby to correctly detect the relative position deviation of the two light spots. The position deviation $\delta'$ of the two light spots caused by the eccentricity of the recording medium may be expressed by equation (3) as discussed above. Thus, in a case of a recording medium having a large eccentricity, obtaining the relative position deviation $\delta_0$ of the light spots 15, 16 from the cross-track signals 64, 65 as explained with FIG. 13, a position deviation $\delta$ observed is as follows.

$$\delta = \delta_0 + \delta' \tag{11}$$

Considering that $\delta_0$ is approximately 0.1 µm, the observed position deviation cannot be ignored.

In the present embodiment, the output of the position sensor 34 is taken into the computing unit 66, and the eccentricity information of the recording medium is stored in the internal memory thereof. In detail, the semiconductor laser 4 is turned on with the light spot 15 for recording and erasing having a reproduction power in such a state that the computing unit 66 has no eccentricity information of the recording medium, and the tracking control is carried out while making the objective lens actuator 12 follow the eccentricity of the recording medium 1 in this state. While the objective lens actuator 12 is following the eccentricity $H_0$ of the recording medium, an eccentricity amount of the recording medium 1 may be obtained from the output of the position sensor 34. The eccentricity amount is $H_0 \sin\omega t$ as described above. The computing unit 66 takes in the eccentricity amount and differentiates it to calculate the quantity $H_0 \cos\omega t$ proportional to the track deviation of the light spot 16 for verification reproduction due to the eccentricity of the recording medium 1. The computing unit 66 obtains from the address information preliminarily formatted in the recording medium 1 a distance L between the light spots 15 and 16 on the recording medium 1, which is determined by the construction of the light head, and a radius R on the recording medium 1 where the light spots 15, 16 are located, and calculates the track deviation amount $\delta'$ of the light spot 16 due to the eccentricity by the recording medium 1 at that radius with reference to the light spot 15. The track deviation amount $\delta'$ may be obtained by the above equation (4).

The eccentricity amount is normally constant independent of the radius R. Thus, once the computing unit 66 takes in the eccentricity information, the track deviation amount of the light spot 16 due to the eccentricity of the recording medium 1 may be calculated in accordance with a radius R of a track on the recording medium 1 to which the light head is making access. The computing unit 66 calculates the relative track position deviation $\delta_0$ of the light spots 15 and 16 using the track deviation amount $\delta'$ due to the eccentricity thus obtained. Using the above equation (11), the relative track position deviation $\delta_0$ may be calculated as follows.

$$\delta_0 = \delta - \delta' = \delta - H_0 \cos\omega t \cdot L/R \qquad (12)$$

As explained, the relative track position deviation $\delta_0$ of the light spots 15, 16 not caused by the eccentricity of the recording medium 1 may be thus obtained. The computing unit 66 calculates a tracking offset $A_0$ to assign the relative position deviation $\delta_0$ thus obtained at a predetermined ratio to the two light spots 15, 16 similar to the embodiment of FIG. 13. The obtained offset $A_0$ is constantly applied to the AT signal 62 as shown in FIG. 16 or FIG. 19. Since the tracking servo is effective on the light spot 15 while the tracking offset is applied to the AT signal as described, the relative track position deviation $\delta_0$ of the two light spots 15, 16 may be equally assigned to the two light spots 15, 16 as shown in FIG. 15B, whereby stable recording, erasing, and reproducing of information may become possible.

The embodiment of FIG. 21 employs another method to detect the relative track position deviation $\delta_0$ of the light spots 15, 16, which is not caused by the eccentricity of the recording medium. In detail, the computing unit 66 takes in to store the output of the position sensor 34, detects a time deviation $\delta_t$ in the same manner as in the first embodiment at a timing of b or d as shown in FIG. 4, and then calculates the track deviation $\delta_0$. Further, in a case that the time deviation $\delta_t$ is detected while opening the tracking control loop as explained in FIG. 14, a timing of an extremum of the eccentricity may be obtained using a rotation synchronizing signal of the recording medium. Alternatively, in a case that the time deviation $\delta_t$ is detected in one track jump as shown in FIG. 18, the position output of the objective lens may be used as detected. Further, the eccentricity of the recording medium may be in general approximated by the above equations (1) and (2). Thus, letting the period of the eccentricity be T', an eccentricity amount at an arbitrary time $t=\alpha$ is equal in amplitude to that at a time $t=\alpha+T'/2$, and is opposite in sign.

$$\delta'(t=\alpha) = H_0 \cos\omega\alpha \cdot L/R = -\delta'(t=\alpha+T'/2) \qquad (13)$$

Accordingly, when $t=\alpha$, the relative position deviation of the light spots is as follows.

$$\delta = \delta_0 + \delta'(t=\alpha) \qquad (14)$$

When $t=\alpha+T'/2$, $$\delta = \delta_0 - \delta'(t=\alpha) \qquad (15)$$

Then, if the time deviation $\delta_t$ of the cross-track signals is detected at each of the above timings and an average thereof is obtained, an approximate $\delta_0$ may be obtained. For example, the time deviation $\delta_t$ may be detected at timings of a and c in FIG. 4. In a case that the time deviation $\delta_t$ is detected while opening the tracking loop, the rotation synchronizing signal of the recording medium may be used. Alternatively, in a case that the time deviation $\delta_t$ is detected in one track jump, the position output of the objective lens may be used.

Figure 22A:
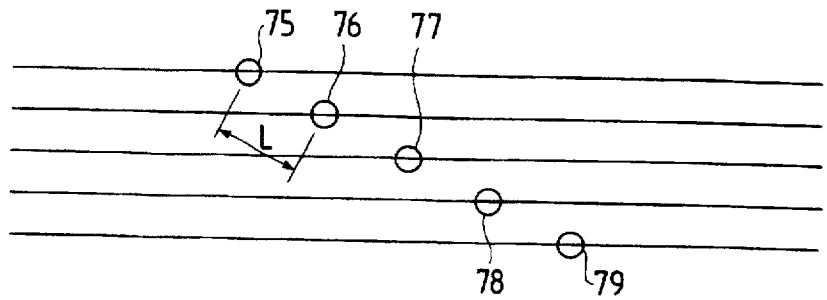
FIG. 22A, FIG. 22B, and FIG. 22C are explanatory drawings to show deviation states of a plurality of light spots tracking-controlled on respective, different tracks, with respect to the tracks without and with application of AT offset.
Figure 22B:
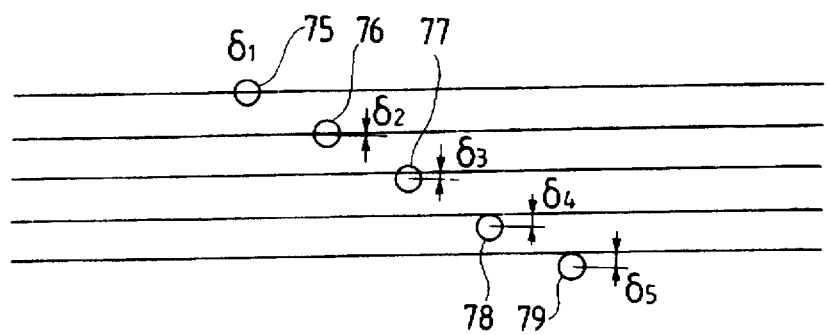

The above embodiments show examples to conduct the tracking control with two light spots on an identical track, while the following is an example to conduct the tracking control with a plurality (two or more) of light spots on a plurality of respective tracks different from each other. The following explains the tracking control with respect to the plurality of tracks. As shown in FIG. 22A, the tracking control is effected on five light spots 75 to 79, and the five light spots are aligned at equal intervals of a distance L. The five light spots are adjusted to locate on the adjacent tracks respectively when the recording medium has no eccentricity, and the tracking control is carried out using the light spot 75. If the recording medium has an eccentricity ($H_0 \sin\omega t$), each of the light spots has a track deviation as shown in an FIG. 22B. A track deviation of i-th light spot $\delta i$ may be determined as follows.

$$\delta i = H_0 \cos\omega t (i-1) \cdot L/R (i=1, 2, \ldots, 5) \qquad (16)$$

Figure 22C:
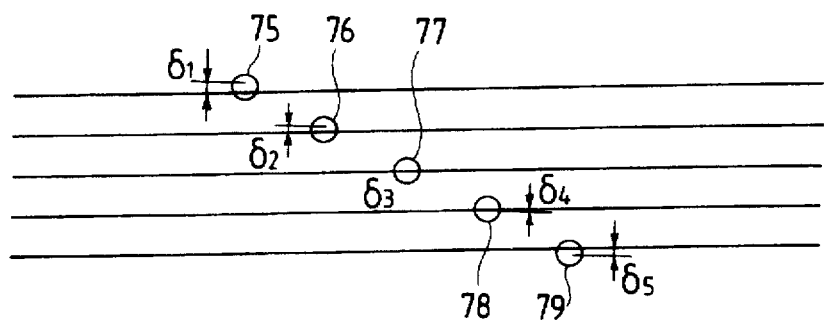

Thus, applying $-2H_0 \cos\omega t \cdot L/R$ as an AT offset, the track deviation may be split to be assigned to the light spots as shown in FIG. 22C. Track deviations of the respective light spots 75 to 79 are as follows. 71030

$$\delta_1 = -2H_0 \cos\omega t \cdot L/R \qquad (17)$$

$$\delta_2 = -H_0 \cos\omega t \cdot L/R \qquad (18)$$

$$\delta_3 = 0 \qquad (19)$$

$$\delta_4 = H_0 \cos\omega t \cdot L/R \qquad (20)$$

and $$\delta_5 = 2H_0 \cos\omega t \cdot L/R \qquad (21)$$

If track deviations of the light spots are detected from cross-track signals as explained with reference to FIG. 13, five photo detectors are provided to receive respective cross-track signals of the five light spots 75 to 79, and a relative position deviation $\delta i$ may be obtained for each light spot on each track. Then, the computing unit calculates a distance L between two light spots and a radius R of the light spot on the recording medium, and an AT offset is applied to the light spot 75 so as to minimize the position deviation of each light spot on each track (for example, to minimize a square sum of the deviations). If the recording medium has an eccentricity, the position deviation except for that caused by the eccentricity of the recording medium may be obtained similar to as in the embodiment of FIG. 21.

According to the present invention as described, the tracking control may be effected with a satisfactory accuracy on each of plural light spots without necessity of a complex trapezoidal shaped prism and rotation actuator, whereby a construction of the light head may be advantageously made greatly simple and compact. Further, the position alignment between the photo detectors and the light spots can be made only with one of the light spots, so that an operation for the position alignment may be advantageously greatly reduced between the light spots and the sensors in production, which would otherwise be tedious.

What is claimed is:

1. An optical information recording and/or reproducing apparatus for effecting recording and/or reproduction while positioning a plurality of light spots to a single information track or a plurality of information tracks, said apparatus comprising:

means for forming first and second light spots, with a predetermined distance between the light spots, on a disc-like optical information recording medium to perform at least one of recording of information on and reproducing of information from the recording medium;

tracking control means for conducting tracking control for at least one of the first and second light spots;

detecting means for detecting an eccentricity amount of the recording medium;

determining means for determining the position of the first light spot in the radial direction of the recording medium;

calculating means for calculating a tracking offset amount to be assigned, at a predetermined ratio, to the first and second light spots, based on (i) the eccentricity amount detected by said detecting means, (ii) the position information of the first light spot in the radial direction of the recording medium determined by said determining means, and (iii) the predetermined distance between the first and second light spots; and applying means for applying the calculated offset amount to said tracking control means in synchronism with an eccentricity of the recording medium.

2. An apparatus according to claim 1, wherein said detecting means comprises means for detecting a position of an objective lens that forms the first and second light spots on the disc-like optical information recording medium.

3. An optical information recording and/or reproducing apparatus for effecting recording and/or reproduction while positioning a plurality of light spots to a single information track or a plurality of information tracks, said apparatus comprising:

means for forming first and second light spots on an optical information recording medium to perform at least one of recording information on and reproducing information from the recording medium;

tracking control means for conducting tracking control for at least one of the first and second light spots;

detecting means for detecting a relative track deviation amount of the first and second light spots, said detecting means detecting the relative track deviation amount from signals generated when the first and second light spots cross a track of the recording medium;

calculating means for calculating a tracking offset amount to be assigned, at a predetermined ratio, to the first and second light spots based on the detected track deviation amount; and applying means for applying the calculated offset amount to said tracking control means upon recording information on and reproducing information from the recording medium.

4. An apparatus according to claim 3, wherein said means for forming first and second light spots forms the first and second light spots on the recording medium to perform recording and reproducing of information simultaneously.

5. A tracking control method in an optical information recording and/or reproducing apparatus for effecting recording and/or reproduction while positioning a plurality of light spots to a single track or a plurality of tracks, said method comprising steps of:

forming at least one of first and second light spots on a disk-like optical information recording medium with a predetermined distance between the light spots, and detecting an eccentricity amount of the recording medium;

determining the position of the first light spot in the radial direction of the recording medium;

calculating a tracking offset amount to be assigned, at a predetermined ratio, to the first and second light spots, based on (i) the eccentricity amount detected, (ii) the position information of the first light spot on the recording medium, and (iii) the distance information between the first and second light spots; and applying the calculated offset amount to tracking control means, and conducting tracking control for at least one of the first and second light spots.

6. A tracking control method in an optical information recording and/or reproducing apparatus for effecting recording and/or reproduction while positioning a plurality of light spots to a single track or a plurality of tracks, said method comprising the steps of:

forming first and second light spots on an optical information recording medium to perform at least one of recording information on and reproducing information from the recording mediums;

detecting a relative track deviation amount of the first and second light spots, the relative track deviation amount being detected from signals generated when the first and second light spots cross a track of the recording medium;

calculating a tracking offset amount to be assigned, at a predetermined ratio, to the first and second light spots based on the detected track deviation amount; and applying the calculated offset amount to tracking control means upon recording information on and reproducing information from the recording medium, and conducting a tracking control for at least one of the first and second light spots.

7. A method according to claim 6, wherein said forming step forms the first and second light spots on the recording medium to perform recording and reproducing of information simultaneously.

* * * * *

UNITED STATES PATENT AND TRADEMARK OFFICE
CERTIFICATE OF CORRECTION

PATENT NO. : 5,745,449

DATED : April 28, 1998

INVENTOR(S) : OSAMU KOYAMA

It is certified that error appears in the above-identified patent and that said Letters Patent is hereby corrected as shown below:

ON THE COVER PAGE:

In item [57], the "ABSTRACT", line 8, "includes" should read --include--.

COLUMN 1:

line 36, "3" should read --3 of--.

COLUMN 3:

line 43, the right margin should be closed up;
    line 47, "rising from the accuracy" should read --arising from the inaccuracy--; and
    line 54, "disc" should read --disk--.

COLUMN 6:

line 3, "as will" should read --which will--; and
    line 19, "line in" should read --in--.

UNITED STATES PATENT AND TRADEMARK OFFICE
CERTIFICATE OF CORRECTION

PATENT NO. : 5,745,449

DATED : April 28, 1998

INVENTOR(S) : OSAMU KOYAMA

It is certified that error appears in the above-identified patent and that said Letters Patent is hereby corrected as shown below:

COLUMN 15:

line 4, "as in" should be deleted.

COLUMN 16:

line 45, "mediums" should read --medium--.

Signed and Sealed this

Twelfth Day of January, 1999

Attest:

Attesting Officer

*Acting Commissioner of Patents and Trademarks*